(12) United States Patent
Kennedy et al.

(10) Patent No.: US 10,409,604 B2
(45) Date of Patent: Sep. 10, 2019

(54) APPARATUS AND METHOD FOR PERFORMING MULTIPLY-AND-ACCUMULATE-PRODUCTS OPERATIONS

(71) Applicant: Arm Limited, Cambridge (GB)

(72) Inventors: Michael Alexander Kennedy, Cambridge (GB); Neil Burgess, Cardiff (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/859,931

(22) Filed: Jan. 2, 2018

(65) Prior Publication Data

US 2018/0307489 A1 Oct. 25, 2018

Related U.S. Application Data

(63) Continuation-in-part of application No. 15/494,946, filed on Apr. 24, 2017.

(51) Int. Cl.
*G06F 9/30* (2018.01)
*G06F 7/544* (2006.01)

(52) U.S. Cl.
CPC ........ *G06F 9/30196* (2013.01); *G06F 7/5443* (2013.01); *G06F 9/3001* (2013.01); *G06F 9/30032* (2013.01); *G06F 9/30036* (2013.01)

(58) Field of Classification Search
CPC .................................................. G06F 7/5443

(Continued)

(56) References Cited

U.S. PATENT DOCUMENTS 5,442,576 A 8/1995 Gergen
6,718,465 B1 * 4/2004 Lin ........................ G06F 7/5324
326/41

(Continued)

FOREIGN PATENT DOCUMENTS

WO 99/21078 4/1999

OTHER PUBLICATIONS

Office Action dated Aug. 23, 2018 in co-pending U.S. Appl. No. 15/494,946, 27 pages.

(Continued)

*Primary Examiner* — Andrew Caldwell
*Assistant Examiner* — Emily E Larocque
(74) *Attorney, Agent, or Firm* — Nixon & Vanderhye P.C.

(57) ABSTRACT

An apparatus and method are provided for performing multiply-and-accumulate-products (MAP) operations. The apparatus has processing circuitry for performing data processing, the processing circuitry including an adder array having a plurality of adders for accumulating partial products produced from input operands. An instruction decoder is provided that is responsive to a MAP instruction specifying a first J-bit operand and a second K-bit operand, to control the processing circuitry to enable performance of a number of MAP operations, where the number is dependent on a parameter. For each performed MAP operation, the processing circuitry is arranged to generate a corresponding result element representing a sum of respective ExF products of E-bit portions within an X-bit segment of the first operand with F-bit portions within a Y-bit segment of the second operand, where E<X≤J and F<Y≤K. In response to the MAP instruction, the instruction decoder is configured to control the processing circuitry to perform a rearrangement operation to rearrange the portions of at least one of the first operand and the second operand to form transformed first (Continued)

and second operands so that the E×F products that are required to be summed are aligned with a number of columns of adders within the adder array. Further, the adder array is controlled in dependence on the transformed first and second operands to add the required E×F products using the number of columns of adders within the adder array. Further, the rearrangement performed by the rearrangement operation is controlled in dependence on the parameter such that at least one column of adders used when the parameter indicates the first number of MAP operations is reused when the parameter indicates a second number of MAP operations different to the first number. This provides a particularly area and power efficient implementation for handling MAP operations.

21 Claims, 15 Drawing Sheets

(58) Field of Classification Search
USPC .................................................. 708/522, 523
See application file for complete search history.

(56) References Cited

U.S. PATENT DOCUMENTS

| | | | |
|---|---|---|---|
| 7,958,179 B2* | 6/2011 | Lyuh | G06F 7/57 |
| | | | 708/490 |
| 2002/0040379 A1* | 4/2002 | Amer | G06F 7/5324 |
| | | | 708/523 |
| 2004/0210616 A1 | 10/2004 | Debes | |
| 2004/0267855 A1 | 12/2004 | Shantz | |
| 2005/0187998 A1 | 8/2005 | Zheng | |
| 2007/0192399 A1 | 8/2007 | Krithivasan | |
| 2011/0040815 A1* | 2/2011 | Penton | G06F 7/483 |
| | | | 708/205 |
| 2012/0233234 A1 | 9/2012 | Brooks | |

OTHER PUBLICATIONS

Final Office Action dated Jan. 10, 2019 in U.S. Appl. No. 15/494,946, 25 pages.

* cited by examiner

US 10,409,604 B2

APPARATUS AND METHOD FOR PERFORMING MULTIPLY-AND-ACCUMULATE-PRODUCTS OPERATIONS

This application is a continuation-in-part of U.S. application Ser. No. 15/494,946, filed on Apr. 24, 2017, the entire contents of which is hereby incorporated by reference.

BACKGROUND

The present technique relates to an apparatus and method for performing multiply-and-accumulate-products (MAP) operations.

Within a data processing system, processing circuitry may be provided for performing data processing in response to instructions. The processing circuitry may include multiplication circuitry for multiplying a pair of operands in order to generate a product result. The multiplication circuitry may include an array of adders for accumulating partial products of the pair of operands.

Single Instruction Multiple Data (SIMD) circuitry can be used to allow multiple operations to be performed in parallel. When seeking to accumulate a number of multiplication products, such SIMD circuitry can be used to enable the calculation and adding of more than one product per instruction. Hence, a multiply-and-accumulate-products (MAP) instruction can be executed in order to enable a number of products to be calculated and accumulated together within an accumulate register.

It would be desirable to enable the execution of such MAP instructions to be performed in a manner which is efficient in terms of circuit area and/or power consumption.

SUMMARY

In a first example arrangement, there is provided an apparatus comprising: processing circuitry to perform data processing, the processing circuitry comprising an adder array having a plurality of adders for accumulating partial products produced from input operands; an instruction decoder responsive to a multiply-and-accumulate-products (MAP) instruction specifying a first J-bit operand and a second K-bit operand, to control the processing circuitry to enable performance of a number of multiply-and-accumulate-products operations, where the number is dependent on a parameter, such that for each performed multiply-and-accumulate-products operation the processing circuitry is arranged to generate a corresponding result element representing a sum of respective E×F products of E-bit portions within an X-bit segment of the first operand with F-bit portions within a Y-bit segment of the second operand, where $E<X \leq J$ and $F<Y \leq K$; wherein, in response to the MAP instruction, the instruction decoder is configured to control the processing circuitry to perform a rearrangement operation to rearrange the portions of at least one of the first operand and the second operand to form transformed first and second operands so that the E×F products that are required to be summed are aligned with a number of columns of adders within the adder array, and to control the adder array in dependence on the transformed first and second operands to add the required E×F products using said number of columns of adders within the adder array; wherein the rearrangement performed by the rearrangement operation is controlled in dependence on the parameter such that at least one column of adders used when the parameter indicates a first number of multiply-and-accumulate-products operations is reused when the parameter indicates a second number of multiply-and-accumulate-products operations different to said first number.

In another example arrangement there is provided a method of performing multiply-and-accumulate-products operations within an apparatus having processing circuitry to perform data processing, the processing circuitry comprising an adder array having a plurality of adders for accumulating partial products produced from input operands, the method comprising: in response to a multiply-and-accumulate-products (MAP) instruction specifying a first J-bit operand and a second K-bit operand: enabling performance by the processing circuitry of a number of multiply-and-accumulate-products operations, where the number is dependent on a parameter, such that for each performed multiply-and-accumulate-products operation the processing circuitry generates a corresponding result element representing a sum of respective E×F products of E-bit portions within an X-bit segment of the first operand with F-bit portions within a Y-bit segment of the second operand, where $E<X \leq J$ and $F<Y \leq K$; performing a rearrangement operation to rearrange the portions of at least one of the first operand and the second operand to form transformed first and second operands so that the E×F products that are required to be summed are aligned with a number of columns of adders within the adder array; and controlling the adder array in dependence on the transformed first and second operands to add the required E×F products using said number of columns of adders within the adder array; wherein the rearrangement performed by the rearrangement operation is controlled in dependence on the parameter such that at least one column of adders used when the parameter indicates a first number of multiply-and-accumulate-products operations is reused when the parameter indicates a second number of multiply-and-accumulate-products operations different to said first number.

In a yet further example arrangement there is provided an apparatus comprising: processing means for performing data processing, the processing means comprising adder array means having a plurality of adder means for accumulating partial products produced from input operands; an instruction decoder means for controlling the processing means, in response to a multiply-and-accumulate-products (MAP) instruction specifying a first J-bit operand and a second K-bit operand, to enable performance of a number of multiply-and-accumulate-products operations, where the number is dependent on a parameter, such that for each performed multiply-and-accumulate-products operation the processing means is arranged to generate a corresponding result element representing a sum of respective E×F products of E-bit portions within an X-bit segment of the first operand with F-bit portions within a Y-bit segment of the second operand, where $E<X \leq J$ and $F<Y \leq K$; wherein, in response to the MAP instruction, the instruction decoder means for controlling the processing means to perform a rearrangement operation to rearrange the portions of at least one of the first operand and the second operand to form transformed first and second operands so that the E×F products that are required to be summed are aligned with a number of columns of adder means within the adder array means, and for controlling the adder array means in dependence on the transformed first and second operands to add the required E×F products using said number of columns of adder means within the adder array means; wherein the rearrangement performed by the rearrangement operation is controlled in dependence on the parameter such that at least one column of adder means used when the parameter indicates a first number of multiply-and-accumulate-products operations is reused when the parameter indicates a second number of multiply-and-accumulate-products operations different to said first number.

BRIEF DESCRIPTION OF THE DRAWINGS

The present technique will be described further, by way of example only, with reference to examples thereof as illustrated in the accompanying drawings, in which.

DESCRIPTION OF EXAMPLES

Figure 1:
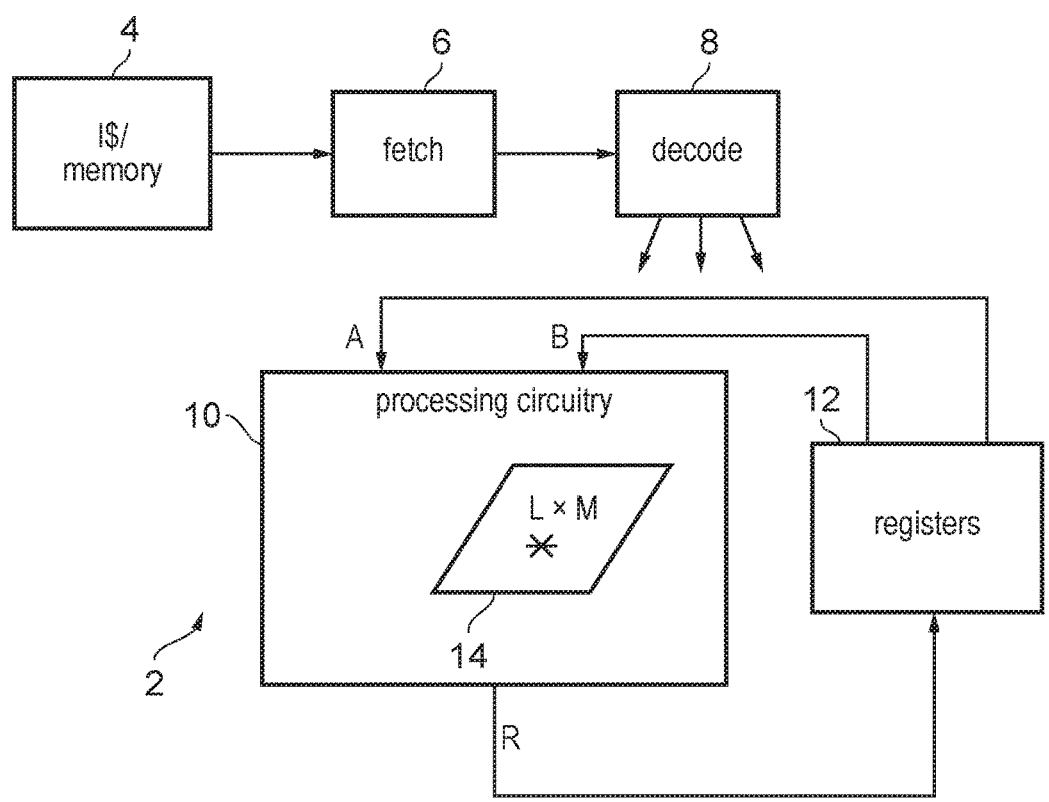
FIG. 1 schematically illustrates an example of a data processing apparatus having a multiplier array.

Some processing applications may require the accumulation of a large number of products. This is for example the case in digital signal processing (DSP) applications, where calculations such as Fast Fourier Transforms (FFT) or Discrete Cosine Transforms (DCTs) may typically involve the addition of many products. One approach for handling such accumulations of products can be to maintain an accumulator register and execute a multiply-accumulate instruction once per product to add the latest product of two operands to the previous accumulator value resulting from the sum of the previous products.

However, performance can be improved by calculating and adding more than one product per instruction. In particular, the earlier mentioned MAP instruction can be used for such purposes. However, it is desirable to provide a mechanism for executing such MAP instructions in a way which can reduce the amount of adder circuitry required, thereby enabling a potential reduction in circuit area, and also enabling a reduction in power consumption.

In one example arrangement, an apparatus is provided that has processing circuitry to perform data processing, the processing circuitry having an adder array formed from a plurality of adders for accumulating partial products produced from input operands. An instruction decoder is then provided which is responsive to a MAP instruction specifying a first J-bit operand and a second K-bit operand, to control the processing circuitry to enable performance of a number of MAP operations, where the number of MAP operations is dependent on a parameter. The parameter can be set in a variety of ways. In one example, the parameter can be identified for each MAP instruction, for example by being specified within the instruction encoding.

For each performed MAP operation, the processing circuitry is arranged to generate a corresponding result element representing a sum of respective E×F products of E-bit portions within an X-bit segment of the first operand with F-bit portions within a Y-bit segment of the second operand, where $E<X\leq J$ and $F<Y\leq K$.

In response to the MAP instruction, the instruction decoder is configured to control the processing circuitry to perform a rearrangement operation in order to rearrange the portions of at least one of the first operand and the second operand to form transformed first and second operands so that the E×F products that are required to be summed are aligned with a number of columns of adders within the adder array. Then the adder array can be controlled in dependence on the transformed first and second operands to add the required E×F products using the number of columns of adders within the adder array. By performing such an alignment, this can significantly improve the efficiency with which the MAP operations are performed, by reducing the number of columns of adders required to support the MAP operations. This in turn can reduce the amount of additional adder circuitry required at the output of the adder array.

However, as mentioned earlier the number of MAP operations whose performance is enabled by the MAP instruction is dependent on a parameter, and typically as the number of MAP operations changes, the columns of adders required will also change.

However, in accordance with the presently described technique, the rearrangement performed by the rearrangement operation is controlled in dependence on the parameter such that at least one column of adders used when the parameter indicates a first number of MAP operations is reused when the parameter indicates a second number of MAP operations different to the first number.

Hence, by careful control of the rearrangement operation performed in dependence on the parameter relevant to each individual MAP instruction, it is possible to significantly constrain the number of columns that need to be provided within the adder array for accumulating the required E×F products. In particular, the columns of adders required when the parameter has the first value can be at least partially aligned with the columns of adders required when the parameter indicates the second value, to allow reuse of one or more columns of adders as the parameter, and hence the number of MAP operations required, changes.

This can provide significant power consumption and circuit area savings. For example, when supporting the performance of MAP operations, it can reduce the complexity of the gating control performed to enable and disable individual adders within the adder array. Further, it can reduce the size and complexity of additional adders that may need to be provided at the output of the adder array, in addition to the adders already provided within the adder array for accumulating partial products. In addition, if dedicated adder array circuitry is to be produced to support the performance of MAP operations, it can significantly reduce the total number of adders required within that adder array due to the way in which the columns of adders required are constrained to at least partially overlap as the parameter value changes.

In one example, a plurality of columns of adders within the adder array are used to add the required E×F products when the parameter indicates the first number of MAP operations. Further, when the parameter indicates the second number of MAP operations, the rearrangement performed by the rearrangement operation is controlled such that the E×F products that are required to be summed during performance of said second number of MAP operations are added using only columns of adders within said plurality of columns. Hence, in accordance with such an approach, the rearrangement operations are controlled so that when the parameter indicates a second number of MAP operations, all of those operations can be supported using columns of adders that are also to be used when the parameter indicates the first number of MAP operations. Thus, by such an approach, a set of columns of adders can be defined which can then be reused for each of the possible values of the parameter, and hence for each of the possible number of MAP operations that may need to be performed in response to the MAP instruction, allowing for a very efficient implementation.

There are a variety of ways in which the number of MAP operations can be determined. In one example, each MAP operation is arranged to operate on a fixed number of portions of the first operand and a fixed number of portions of the second operand, and the number of MAP operations that are enabled to be performed in response to the MAP instruction is dependent on the number of portions within at least one of the first operand and the second operand.

In one example arrangement, the parameter comprises an element size specified for the MAP instruction, the element size being used to determine values of E and F. In one particular example, the element size can directly identify the value of E and/or F, and hence identify the size of the portions within the first and second operands that are to be multiplied together and accumulated.

The values of J and K, i.e. the sizes of the input operands for the MAP instruction, can be determined in a variety of ways, but in one embodiment J and K are determined by a vector width of the apparatus. Hence, purely by way of example, if the vector width is 64 bits, then the values of J and K can be determined such that integer multiples of J and K will map to the vector width (where the integer is 1 or more). For example, in one example arrangement both J and K may be set equal to 64 bits, in another example arrangement one of J and K may be 64 bits, and the other may be 32 bits, etc.

The number of MAP operations to be performed determines the number of segments within at least one of the input operands. In one example arrangement, when the element size specifies a first value, both the first operand and the second operand comprise a single segment such that a single MAP operation is enabled to be performed, and when the element size specifies a second value at least one of the first operand and the second operand comprise multiple segments such that a plurality of MAP operations are enabled to be performed. The rearrangement performed by the rearrangement operation is controlled in dependence on the element size such that the columns of adders used for performance of the single MAP operation when the element size specifies the first value are reused for performance of the plurality of MAP operations when the element size specifies the second value.

In one particular example arrangement, when the element size specifies the second value at least one of the first operand and the second operand comprise two segments such that two MAP operations are enabled to be performed. The rearrangement performed by the rearrangement operation is then controlled in dependence on the element size such that a number of outer columns within the columns of adders used for performance of the single MAP operation when the element size specifies the first value are reused to perform the two MAP operations when the element size specifies the second value.

Hence, by such an approach, when the element size specifies the second value, the rearrangement operation is controlled so that the columns of adders required to support the two MAP operations are formed using a subset of the columns of adders that are used when the element size specifies the first value, in particular causing at least the two outermost columns of the adders to be reused when the element size specifies the second size.

Whilst in some example arrangements the value of J may differ from the value of K and the value of E may differ from the value of F, in one example arrangement J is equal to K and E is equal to F. Hence, both the first and second operands are of the same size, and contain the same sized portions/elements.

In one particular example, when the element size specifies the first value, E comprises T bits, $X=Y=J=K$, and the single MAP operation is arranged to sum $J/E$ E×F products using a plurality of columns of adders. Further, when the element size specifies the second value, $X=Y=J/2$, E comprises $T/2$ bits, and each of the two MAP operations is arranged to sum $X/E$ E×F products using at least one outer column of said plurality of columns of adders.

It will hence be appreciated that in such an example arrangement, whilst the size of the individual elements changes dependent on the number of MAP operations to be performed, the number of products accumulated by each MAP operation remains the same. Purely by way of specific example, if the two input operands are 64-bit operands, and the first value identifies that the element size is 16 bits, then the single MAP operation will accumulate four products, each product being produced by multiplying a 16-bit element from the first operand with a corresponding 16-bit element from the second operand. If instead the second value identifies that the element size is 8-bits, then two separate MAP operations are performed, but each MAP operation will accumulate four products again. However, in this instance each of the products will represent the multiplication of an 8-bit element from the first operand with the corresponding 8-bit element from the second operand.

In one example arrangement, it may be the case that all of the MAP operations identified by a particular MAP instruction are always performed. Hence, if the parameter identifies two MAP operations, both of those operations will be performed, if the parameter identifies four MAP operations, all four of those MAP operations will be performed, etc.

However, in accordance with an alternative approach, when a plurality of MAP operations are determined from the parameter, the instruction decoder is responsive to a restriction parameter to selectively disable performance of a subset of the plurality of MAP operations by the processing circuitry. Hence, by such an approach, it is possible to selectively disable a number of the MAP operations that are identified based on the parameter. This can provide some additional flexibility with regards to the accumulations performed.

In one example arrangement, the adder array is dedicated adder circuitry for use when performing the MAP operations, and is formed by a plurality of columns of adders. The rearrangement operation performed in dependence on the parameter is then arranged to ensure that, irrespective of the number of MAP operations that are enabled to be performed, the E×F products that are required to be summed are constrained so as to be aligned with one or more columns in said plurality of columns. Through use of the rearrangement technique described above, allowing reuse of columns as the parameter, and hence the number of MAP operations, changes, this can lead to a particularly area efficient adder array that is able to support all of the desired MAP operations.

In addition to the area savings within the adder array, further area savings are also possible in respect of any downstream adder components required to add the outputs from individual columns of the adder array. For example, the adders in the adder array may be formed as carry-save adders, and carry-propagate adder circuitry may be provided at the output of the adder array to produce a final result. The width of the carry-propagate adder circuitry can be significantly reduced, due to the tightly constrained number of columns provided within the adder array.

However, in an alternative arrangement, it is not necessary to provide a dedicated adder array, and instead the adder array may be provided within a L×M multiplier array that enables an L-bit operand to be multiplied with an M-bit operand using a plurality of columns of adders for accumulating partial products of the L-bit operand and the M-bit operand. In such an arrangement, J<L and K<M. The rearrangement operation performed in dependence on the parameter is then arranged to ensure that, irrespective of the number of MAP operations that are enabled to be performed, the E×F products that are required to be summed are constrained to be aligned with one or more columns in a subset of the columns of adders within the multiplier array, such that irrespective of the number of MAP operations to be performed in response to the MAP instruction, adders within that subset of columns of adders are used to sum the required E×F products.

Hence, in such an arrangement, full multiplication of L-bit operands and M-bit operands is still supported, but when instead the earlier described MAP operations are performed, the handling of those MAP operations can be constrained so that only a subset of the columns of adders within the multiplier array need to be used. This can lead to power consumptions savings, and simplify the gating required to enable and disable individual adders during the performance of the MAP operations.

Operand rearrangement circuitry may be provided to rearrange the portions of at least one of the first operand and the second operand to form the transformed first and second operands. For example, the operand rearrangement circuitry may comprise a set of multiplexers which select which portions of each operand are mapped to each portion of the transformed operand. Whilst in some cases rearrangements may be performed in respect of both operands, in other cases only one of the operands will have its portions rearranged, and hence in this latter case the transformed operand will be the same as the input operand for one of the operands.

The above-mentioned multiplexers could for example be implemented on the operand path between the register file from which the operands are read and the adder array, or could be incorporated into read ports of the register file which may already have a set of multiplexers that select required data from registers.

For at least one segment of at least one of the first and second operands, the operand rearrangement circuitry may, for at least one value of the parameter, reverse an order of the portions within that segment to form a corresponding segment of the transformed operand. For some variants of the MAP instruction, the segment may correspond to the entire operand, so all the portions within one operand may have their order reversed.

For some types of MAP instruction, the rearrangement performed may not involve a simple reversal of the portions, but a more complex rearrangement may occur in respect of the portions within one or both operands.

The operand rearrangement circuitry may support a number of different rearrangement patterns which may be selected in dependence on the parameter. For example, the different rearrangement patterns may correspond to different values of E and/or F and/or different segment sizes. The parameter used to select which rearrangement pattern to apply could for example be the instruction opcode which identifies the type of instruction (e.g. a number of different opcodes may be assigned to different forms of the MAP instruction). Alternatively, a number of different forms of MAP instruction may share the same opcode but have one or more other bitfields that directly or indirectly identify the rearrangement pattern to be used (e.g. by specifying values for E, F or the segment size, specifying an encoded value representing the particular rearrangement pattern, or specifying a register storing information for determining the rearrangement pattern).

In one example arrangement, for at least one value of the parameter, the instruction decoder may control the processing circuitry to rearrange portions of both the first operand and the second operand when producing the transformed first and second operands. Further, for a different value of the parameter, the instruction decoder may control the processing circuitry to rearrange portions of only one operand, leaving the other operand unchanged (i.e. for that other operand the transformed operand is the same as the original operand).

The processing circuitry may include partial product forming circuitry to generate the partial products to be accumulated by the adders of the adder array. In one example arrangement, the partial product forming circuitry may be dedicated circuitry used to produce the required partial products to be added together when performing MAP operations.

However, alternatively, in an implementation where the adder array is provided within an L×M multiplier array used to allow an L-bit operand to be multiplied by an M-bit operand, then for a standard multiply instruction the partial product forming circuitry may for example form L 1*M-bit partial products or M 1*L-bit partial products to be accumulated. For example, the partial product forming circuitry may comprise a set of AND gates for generating an array of output bits which correspond to the product of the respective combinations of bits of the two input operands for the multiply instruction.

For the MAP instruction, the partial product forming circuitry may be reused, but to mask portions of the multiplier array which do not correspond to any of the E×F products to be added, a subset of partial product bits may be set to zero. This ensures that the output of the multiplier includes one or more portions corresponding to the sum of respective E×F products. Which particular partial product bits are selected as the subset of partial product bits to be cleared to zero may depend on a parameter of the MAP instruction (e.g. the opcode or another bitfield), and may differ for different variants of the MAP instruction.

Particular examples will now be described with reference to the Figures.

FIG. 1 schematically illustrates an example of a portion of a data processing apparatus 2. It will be appreciated that FIG. 1 is a simplified representation and omits many components which would typically be present in a data processor. As shown in FIG. 1 the processing apparatus 2 includes an instruction cache or memory 4 for storing program instructions to be executed, a fetch stage 6 for fetching the instructions from the instruction cache or memory 4. The fetch stage 6 may for example include branch prediction functionality for predicting the outcomes of branch instructions in order to determine the likely course of program flow in the program being executed and fetch corresponding sequences of instructions for decoding and processing. A decode stage 8 decodes the fetched instructions to generate control signals for controlling processing circuitry 10 to perform data processing operations corresponding to those instructions.

In general the processing circuitry 10 may read operand values A, B from registers 12 and generate processing results R to be written back to the registers 12. The processing circuitry 10 may include a number of execution units for performing different kinds of processing operations. For example the execution units can include load/store units for handling memory accesses to a memory, arithmetic/logical execution units for handling integer arithmetic or logical operations and floating point units for handling floating-point operations. As shown in FIG. 1, at least one execution unit of the processing circuit may include an L×M multiplier array 14 for calculating results of multiplications performed on L-bit and M-bit operands. While FIG. 1 shows a single multiplier array 14, some processors may have several multiplier arrays which may support the size operand sizes L, M or could support different operand sizes. For example, in a vector processor, there may be multiple multiplier arrays for handling multiplications performed on respective lanes of a vector operand. Alternatively, the vector instructions could be processed with each lane handled sequentially on a single multiplier. Hence, it will be appreciated that FIG. 1 is just an example and there are many variants of how a multiplier can be implemented for particular kinds of instruction.

Figure 2:
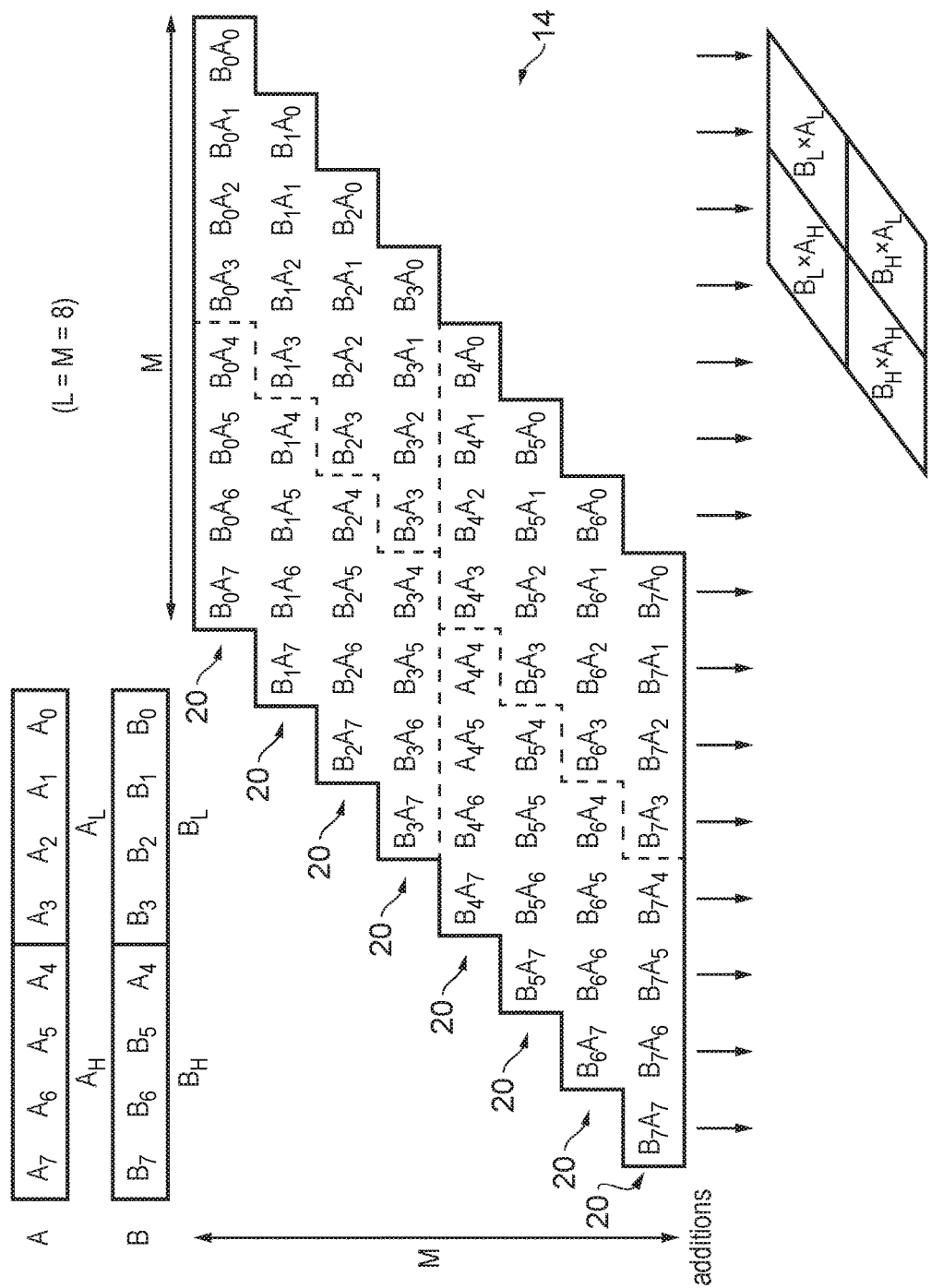
FIG. 2 shows an example of the addition of partial products by adders of an L×M multiplier array, where for this example L=M=8.

FIG. 2 shows an example of L×M multiplication in a case where L=M=8. As shown in FIG. 2, the multiplication can be viewed as a sum of L 1*M-bit (or M 1*L-bit) partial products 20 with each partial product corresponding to the product of a single bit of one of the operands B multiplied with the other operand A. The partial products are aligned based on their relative bit significance, and columns of adders add the correspondingly positioned bits in each column to form the multiplication result. This is similar to the way in which a long multiplication would be calculated by hand.

Figure 3:
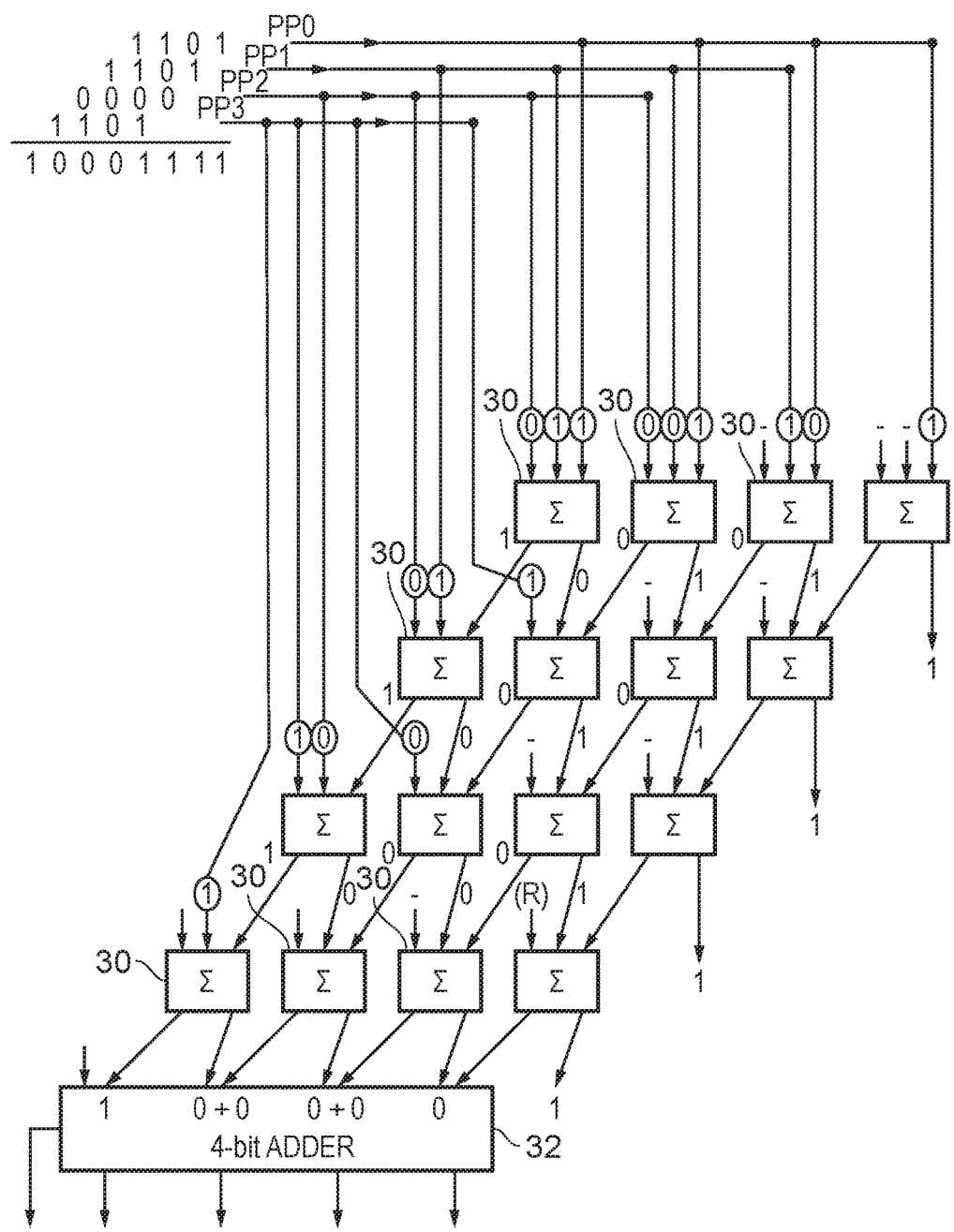
FIG. 3 shows an example of adders for a 4×4 multiplier array.

FIG. 3 shows an example of an array of adders 30 which can be provided within the multiplier array 14 for accumulating the various partial products. For conciseness, the example of FIG. 3 shown with L=M=4. In this example, the multiplier array 14 comprises 4 rows of carry-save adders 30 which are supplied with partial product bits calculated based on the input operands A and B. For example, FIG. 3 shows an example of calculating 13 times 11 in decimal, i.e. 1101×1011 in binary:

```
            1  1  0  1
         1  1  0  1
      0  0  0  0
   1  1  0  1            +
   ─────────────────────
   1  0  0  0  1  1  1  1
```

FIG. 3 shows how the partial products of the sum shown above map to the inputs of the array of adders. The carry save adders produce a 4-bit result in carry-save form (i.e. carries generated in the final row of adders 30 have not yet been added to the addition results of the final row of adders), and so a 4-bit carry-propagate adder 32 is provided to add the sums and carries to produce a 4-bit result in binary form. Note that the actual product result of multiplying two 4-bit values has 8 bits. The result of the carry-propagate adder 32 represents the upper 4 bits, and the lower 4 bits are output directly by the right hand carry-save adder in each row. Some variants of a multiply instruction may return the lower half of the full product instead of the upper half. Either way, it can be seen from the example of FIG. 3 that the 8 bits of the full product correspond to the same bit values shown for the multiplication worked out above.

For some applications, when the upper half of the full product is selected, it may be desirable to round the upper half of the product based on the lower bits. To support this, a rounding constant (R) can be input at the rightmost carry-save adder in the last row, to add 1 to the sum of the partial products at the bits position one place below the least significant bit of the upper half of the product. Hence, if the bit one place below the cut off for the upper half of the product is 1, then adding a further 1 will cause a 1 to be carried over into the least significant bit of the selected half of the product, effectively rounding the result to the nearest value representable using the upper bits. Some rounding modes may prescribe conditions for determining whether a product result exactly half way between two values representable using the upper bits should be rounded up or down. For such rounding modes, the decision on whether to set (R) to 0 or 1 may depend on the values of the lower bits of the full product which are not selected for output.

FIG. 3 is just one example of a possible multiplier design. There are many known techniques for enabling multiplications to be performed faster than is shown in the simple example of FIG. 3, such as using a Wallace tree, Booth encoding or 4:2 compression. The example of FIG. 3 can be expanded to a larger size to support an L×M multiplier array of arbitrary size, but it will be appreciated that this is not the only technique that could be used, and other combinations of adders could be used for accumulating the various partial products of the multiplication.

Figure 4:
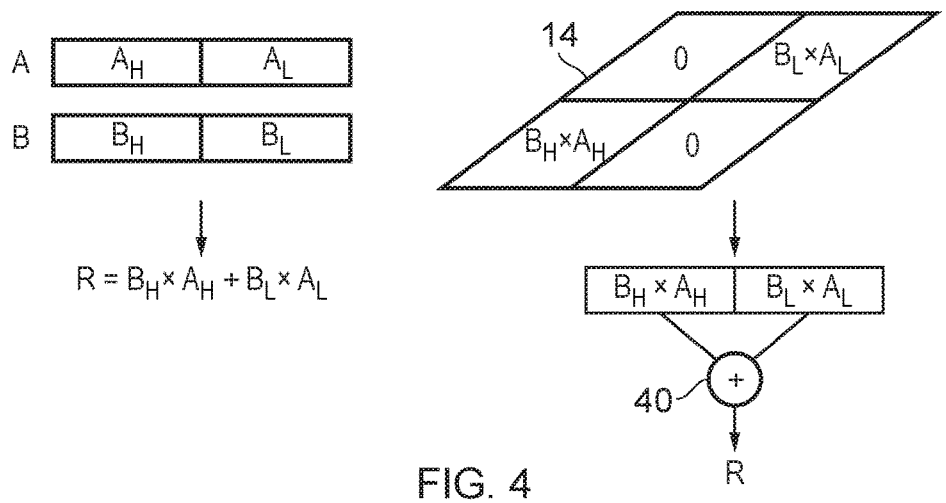
FIG. 4 illustrates, for comparison, an example of accumulating respective products of sub-portions of the operands if the operands are input to the multiplier array in their original form.

As shown in FIG. 4, some processor architectures may support a MAP instruction which returns the sum of respective pairs of products of sub-portions within a larger operand. For example, as shown in FIG. 4, the result of a vector multiply- and accumulate-products instruction may be to multiply the high portions of the input operands A and B, multiply the low portions of the two input operands, and add the two product results. This type of operation can be very useful for DSP applications for example. Other variants of such sub-vector multiply-and-add instructions operating on the 32-bit operand could return results as follows:

$$(A[31{:}24] \times B[31{:}24]) + (A[23{:}16] \times B[23{:}16]) + (A[15{:}8] \times B[15{:}8]) + (A[7{:}0] \times B[7{:}0])$$

$$(A[31{:}24] \times B[23{:}16]) + (A[23{:}16] \times B[31{:}24]) \text{ in parallel with } (A[15{:}8] \times B[7{:}0]) + (A[7{:}0] \times B[15{:}8])$$

The addends for the accumulation for such a MAP instruction may be the lower half of the product resulting from each sub-multiplication (the upper half of the full product of each sub-multiplication can be ignored). Note that the MAP instruction does not require all of the sub products to be added together. For example in the second of the two examples shown above the second option provides for each pair of adjacent sub-products to be added together but the first and second sub-products are not added to the third and fourth products.

As shown by the dotted lines in FIG. 2, the L×M multiplier array can be conceptually split into portions which map to the product of certain subportions of the input operands. For example, if the portions are the respective halves of the operands A and B, then the multiplier can be divided conceptually into quadrants as shown at the bottom of FIG. 2. The top-right quadrant multiplies the lower halves $B_L$, $A_L$ of the two operands. The top-left quadrant multiplies the upper half $A_H$ of operand A with the lower half $B_L$ of operand B. The bottom-right quadrant multiplies the lower half $A_L$ of operand A with the upper half $B_H$ of operand B. The bottom-left quadrant multiplies the top halves $A_H$, $B_H$ of the two operands A and B. Note that the positions of the respective quadrants in the multiplication array mean that the top-left and bottom-right quadrants have their results added together by the columns of adders within the multiplier array 14, but the bottom-left and top-right quadrants are in separate columns of adders and so are not added.

Hence, for implementing a MAP instruction with operands A and B input to the multiplier in their original form, it is possible to calculate the products of the upper and lower halves of the operands A and B respectively within the multiplier array as shown in the right hand part of FIG. 4, but this would require a further adder 40 provided beyond the output of the multiplier array 14 in order to add the respective sub products together. This additional adder 40 adds extra circuit area and power consumption and also adds extra latency to the operation. This issue can be addressed by reordering one of the input operands so that the accumulations of the respective sub products can take place within the existing multiplier array 14, eliminating the need for subsequent adding circuitry 40.

Figure 5:
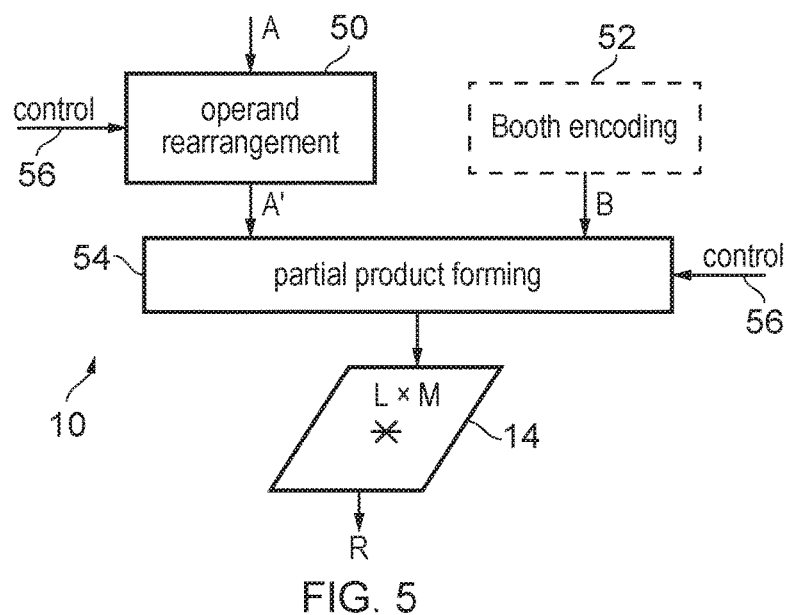
FIG. 5 shows an example of a portion of the processing circuitry for handling multiply-and-accumulate-products (MAP) instructions.

FIG. 5 shows an example of a portion of the processing circuitry 10 comprising the L×M multiplier array 14. Prior to the input of the L×M multiplier 14, operand rearrangement circuitry 50 is provided for reordering F-bit portions of operand A for the MAP instruction to form a transformed operand A'. Optionally, Booth encoding circuitry 52 may be provided for Booth encoding the other operand B in parallel with the operand rearrangement being performed by the operand rearrangement circuitry 50. However, some implementations may not use Booth encoding and in this case circuitry 52 can be omitted. If Booth encoding is used, then to support unsigned multiplications additional rows of carry save adders 30 can be included in the multiplier to handle additional digits introduced by the Booth encoding.

The first operand B (comprising J bits) and transformed operand A' (comprising K bits) are both provided to partial product forming circuitry 54 which calculates a number of partial product bits which are supplied to the respective adders 30 of the L×M multiplier 40. The partial product forming circuitry 54 selects certain bits which are cleared to 0 depending on the particular variant of the MAP instruction being executed. Hence, both the operand rearrangement circuitry 50 and the partial product forming circuitry 54 are dependent on at least one control parameter 56 which is determined in dependence on the encoding of the MAP instruction by the instruction decoder 8 or accessed from a register referenced by the MAP instruction.

Figure 6:
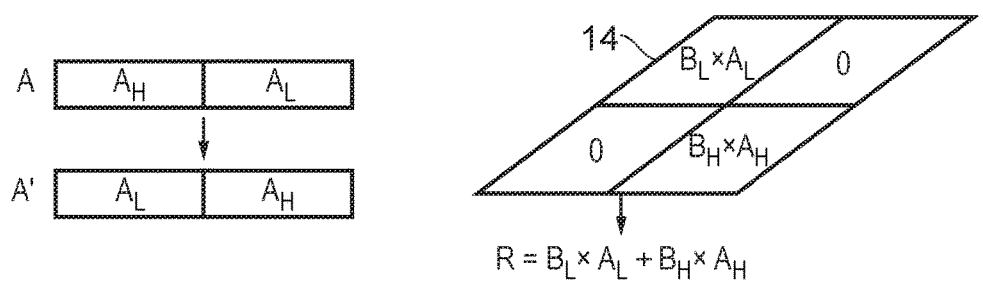
FIG. 6 shows an example of rearranging one of the operands so that the respective products of sub-portions of the operands can be added using a subset of the same adders used for accumulating partial products in response to a multiply instruction.

FIG. 6 shows an example of the general principle of handling a MAP instruction using the existing multiplier. In this example, X=Y=J=K and E=F=M/2. Hence, in this case the reordering applied by the operand rearrangement circuitry 50 swaps the order of the upper and lower halves of the second operand A to generate the transformed operand A'. As shown in the right hand side of FIG. 6, this means that when the operands are provided to the multiplier array 14, the portions of the multiplier array multiplying the top halves of the two operands and the bottom halves of the two operands are in the top left and bottom right quadrants of the multiplier respectively. Inputs to the bottom left and top right quadrants can be set to zero by the partial product forming circuitry 54. This means that when the various columns of adders calculate their sums in a similar way to discussed above for FIGS. 2 and 3, then the output of the adders within the portion corresponding to the top left and bottom right quadrants of the multiplier will generate a result which corresponds to the total of a first E×F product corresponding to the upper halves of operands A and B and a second E×F product corresponding to the lower halves. Hence, the accumulation of the respective sub products has been calculated within the L×M multiplier itself rather than requiring a further adding stage.

Figure 7A:
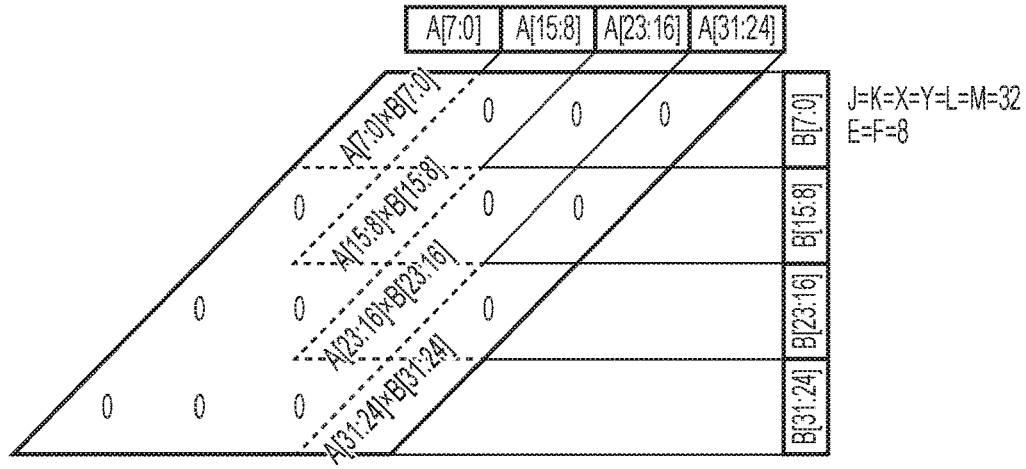
FIGS. 7A to 7C show examples of configuring the multiplier array to handle three different variants of a MAP instruction.
Figure 7B:
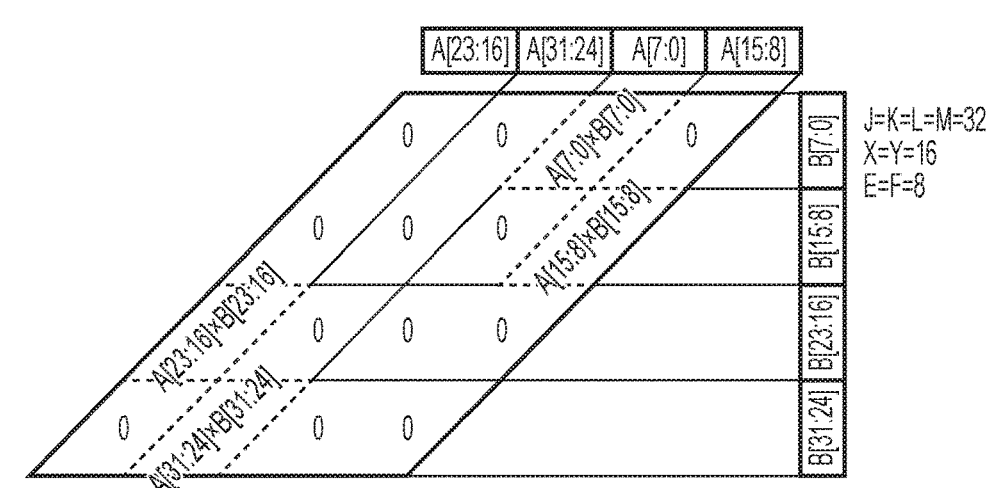
Figure 7C:
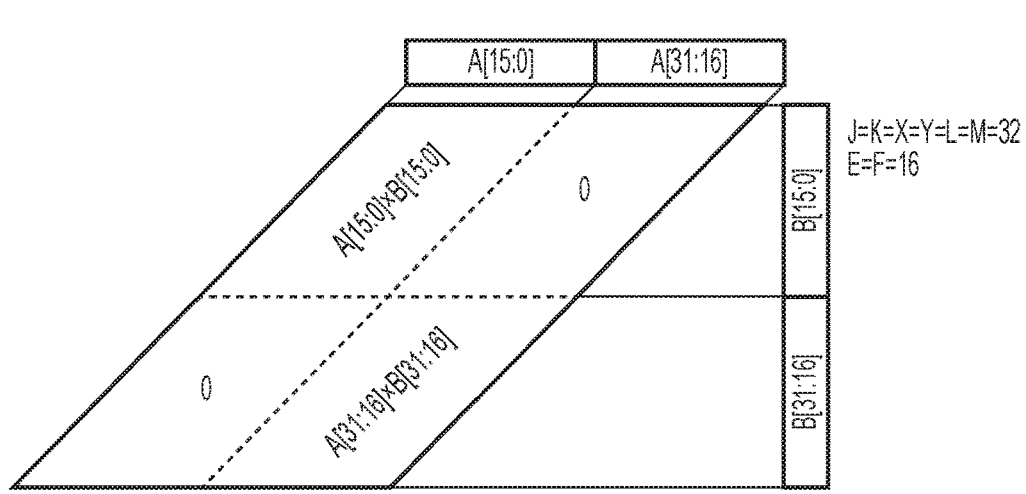

FIGS. 7A to 7C show three more examples of handling variants of a MAP instruction. In FIG. 7A four 8×8 products are calculated and added using a 32×32 multiplier array, by reversing the order in which the respective 8-bit portions of one of the input operands A are presented to the multiplier. In FIG. 7B, two pairs of 8×8 products are added together, but the respective pairs are not added, to form two independent result elements each corresponding to a sum of two 8×8 products. In this case, the 8-bit portions within each half of operand A are swapped but they remain within the same half of the operand when transforming A into A'. in this case N is less than M. In FIG. 7C, the MAP instruction is similar to the example of FIG. 6 and this example adds two 16×16 products within a 32×32 multiplier array. As shown in FIGS. 7A to 7C, unused portions of the multiplier array are zeroed by setting the corresponding partial product bits to 0 at the input of the multiplier.

Figure 7D:
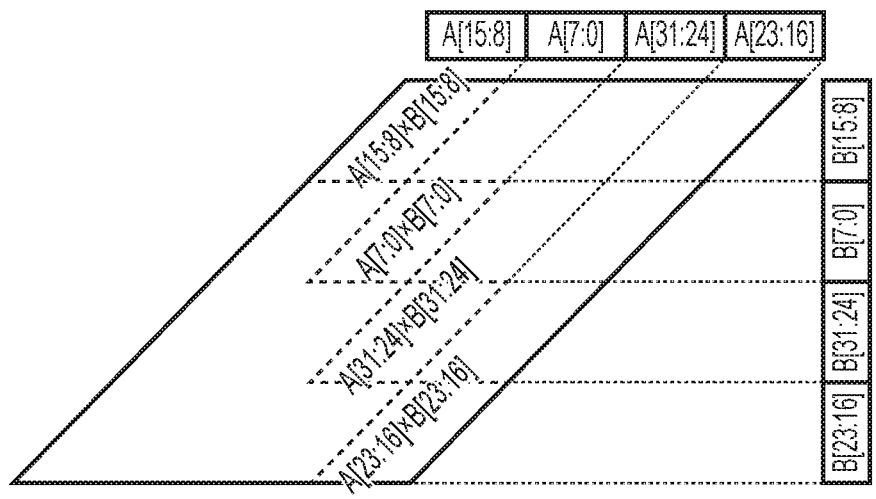
FIG. 7D shows an example of a processing a MAP instruction with rearrangement of elements of both operands.

The examples above show cases where only one of the operands A is rearranged. However, as shown in FIG. 7D, it is also possible to implement the MAP instruction with a rearrangement to both operands. For example, in FIG. 7D the reversal of elements is applied to operand B, but also there is a swapping of the upper and lower halves of both operands A, B, giving the same result as in FIG. 7A. Hence, it is not essential to provide rearrangement of only one of the operands.

Figure 8:
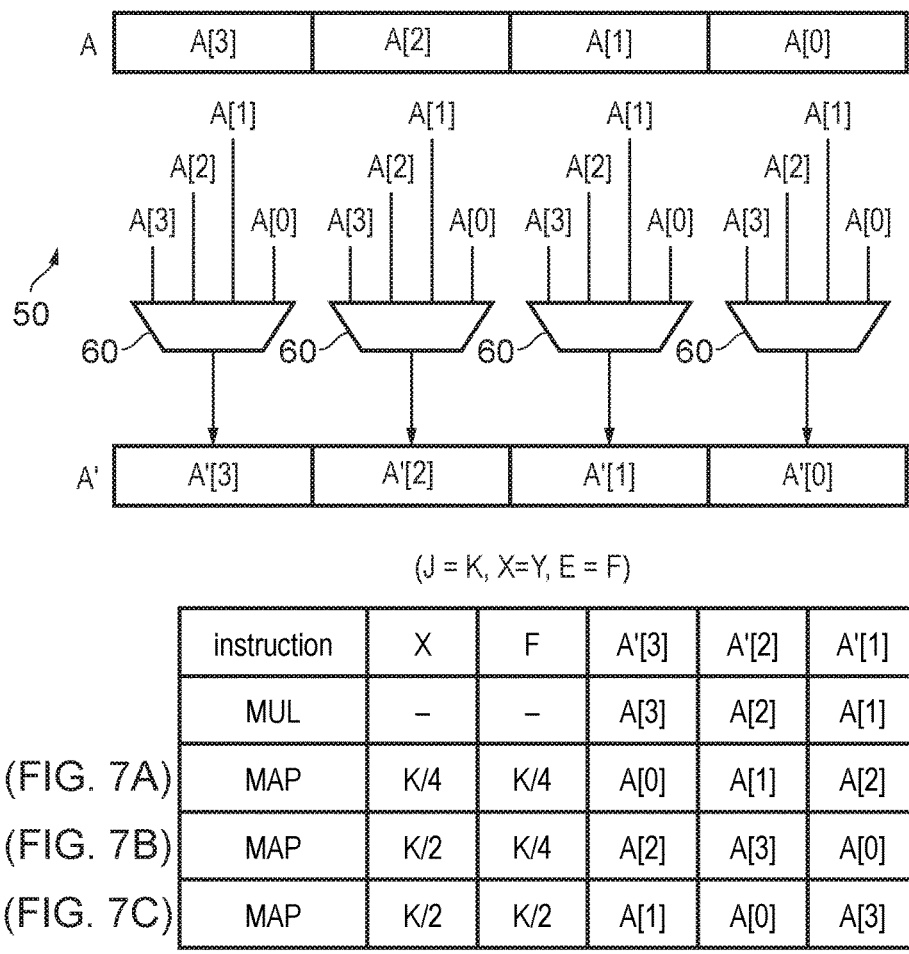
FIG. 8 shows an example of operand rearrangement circuitry for rearranging portions of the second operand.

FIG. 8 shows an example of the operand rearrangement circuitry 50 for supporting the examples of FIGS. 7A-7C. The operand rearrangement circuitry 50 may include a set of multiplexers 60 for selecting which portion of the second operand A is mapped to each of the portions of the transformed operand A'. Each multiplexer 60 may for example correspond to a certain fixed size portion of the second operand A, such as 4 bits, 8 bits or 16 bits. Although FIG. 8 shows an example with four multiplexers 60, clearly this can be scaled to smaller or larger sizes as desired. The table at the bottom of FIG. 8 shows an example of how to control which portions of the input operand A are mapped to each portion of the transformed operand A' for a standard multiply instruction and the three variants of the MAP instruction shown in FIGS. 7A to 7C respectively. For the MAP instructions the corresponding values of Y and F are also shown (in these examples, J=K, X=Y, E=F). In examples such as FIG. 7D where both operands are rearranged a second set of multiplexers similar to the one shown in FIG. 8 could be provided for rearranging operand B, or alternatively each operand A, B could be passed through a single set of multiplexers sequentially with different control inputs to select different rearrangements for each operand.

Figure 9:
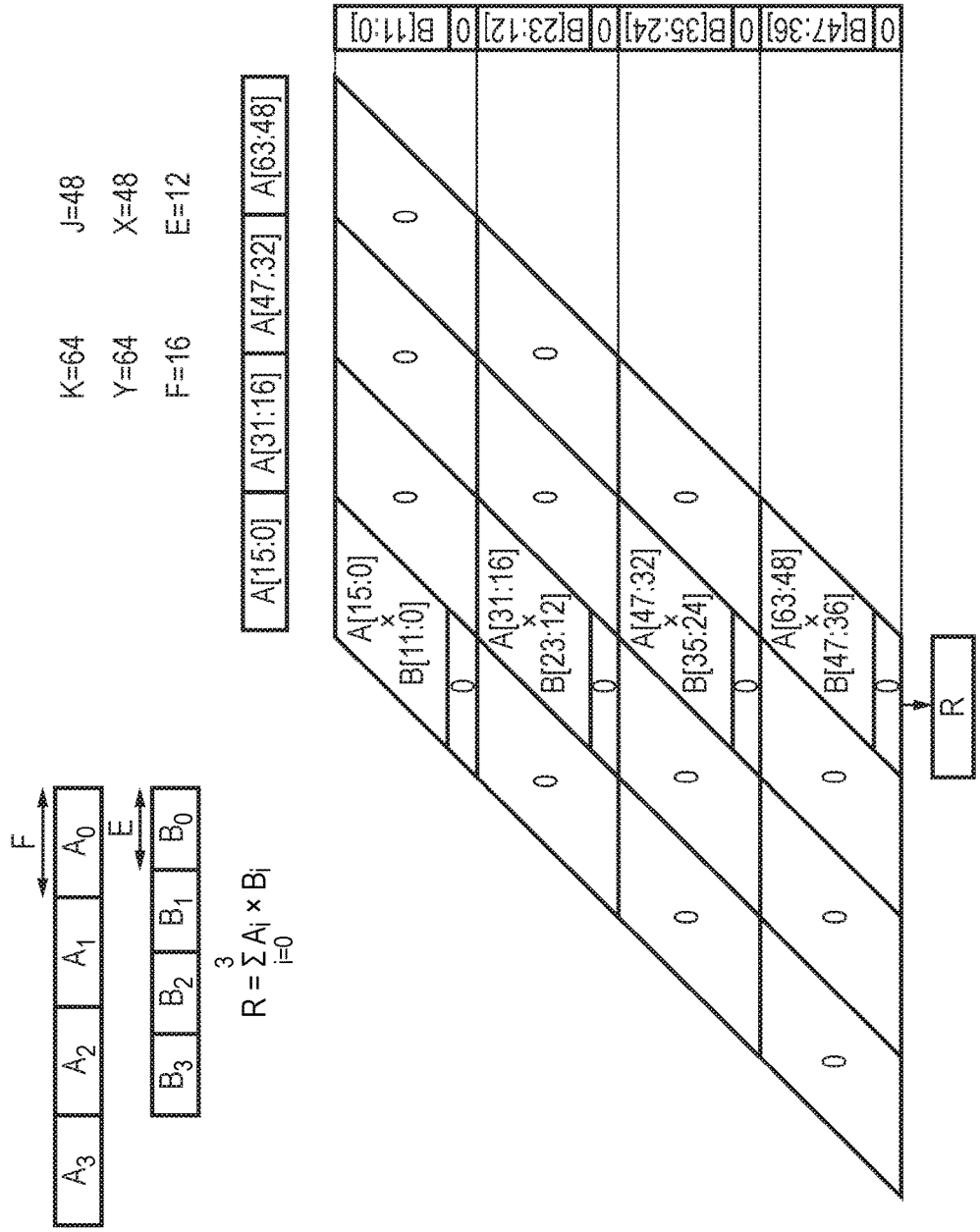
FIG. 9 shows an example of a MAP instruction where the portions multiplied to form each E×F product are of different sizes (E does not equal F)

As shown in FIG. 9, it is not essential for the input operands A, B to the MAP instruction to be of the same size, or for the element size E and F to be the same for the two operands. FIG. 9 shows an example where 16-bit portions of a 64-bit operand A are multiplied with corresponding 12-bit portions of a 48-bit operand B. The 12-bit portions are padded with 0s at the input to the multiplier array to match the width of the 16-bit portions. While the operand rearrangement is applied to the wider operand A in this example, clearly the rearrangement could also be applied to the narrower operand B.

Figure 10:
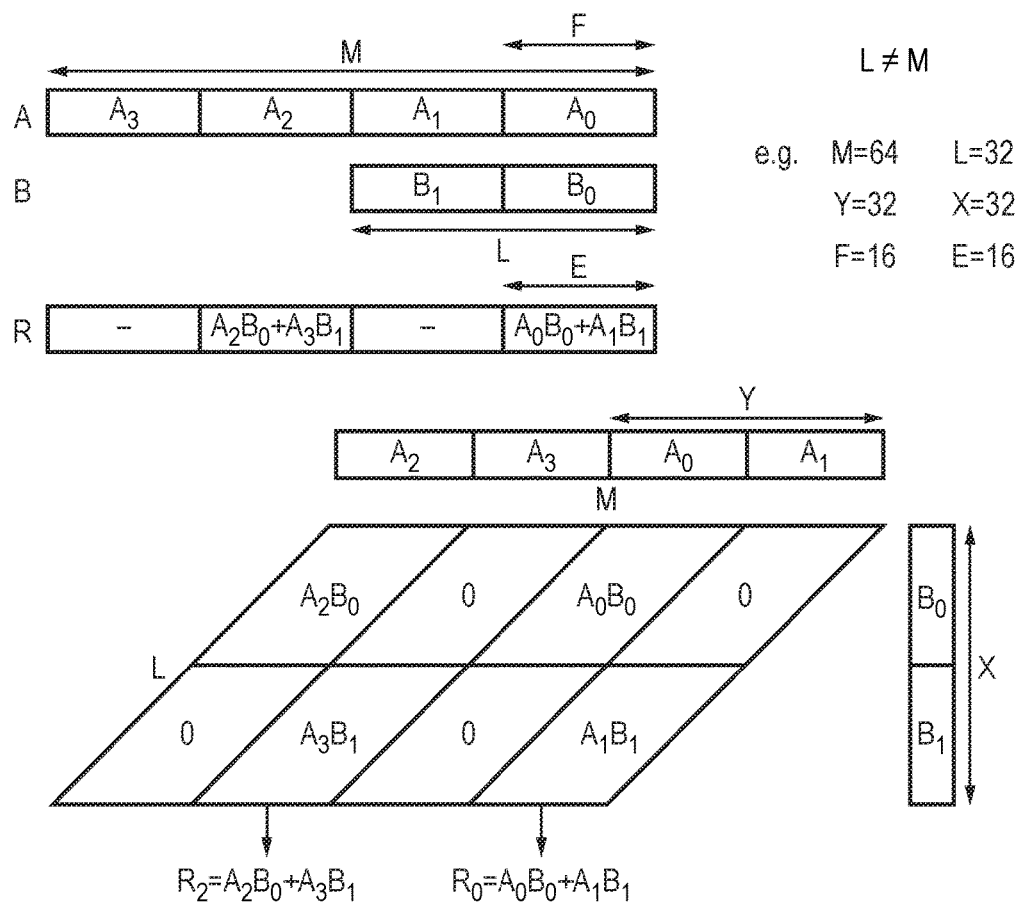
FIG. 10 shows an example of processing a MAP instruction on an L×M multiplier array where L does not equal M.

Also, as shown in FIG. 10, the technique can also be applied to an asymmetric L×M multiplier array where L does not equal M. In this example, M=2L. This example shows a case where two independent result elements are calculated, each corresponding to the same pair of E-bit portions $B_0$, $B_1$ of the first operand B but different pairs of F-bit portions $A_0$, $A_1$ or $A_2$, $A_3$ of the second operand A, with each Y-bit segment of the second operand being reversed in order independently (i.e. $A_2$ and $A_3$ are swapped and $A_0$ and $A_1$ are swapped). However, it would also be possible to calculate a single result element R by zeroing off one of the halves of the array.

An advantage of this technique is that the array of full adders that comprises the majority of both the area and the critical path of an integer multiplier is not affected by this proposal. Thus, acceleration techniques for digital multiplication (such as Wallace tree, 4:2 compression etc.) are still available. For signed multiplications, this proposal is also compatible with Booth coding which trades complexity of partial product generation for size of full adder array.

It will be appreciated from the above discussion of FIGS. 1 to 10 that a technique has been described that allows the products to be accumulated during performance of a MAP operation (also referred to herein as a dot product operation) to be aligned with one or more columns of adders within the multiplier array. With reference to the following description, a technique will now be described that provides a further enhancement, whereby the rearrangement operation performed in response to execution of MAP instructions can be modified so as to allow the same subset of columns of adders within the multiplier array to be reused, independent of the number of MAP operations to be performed in response to that instruction. This can provide particular area and power consumption benefits. Indeed, it also allows a dedicated adder array to be produced for performing MAP operations that does not require all of the adders usually associated with the multiplier array to be provided, given that in all instances the required accumulations can be performed within a particular group of adder array columns.

Figure 11:
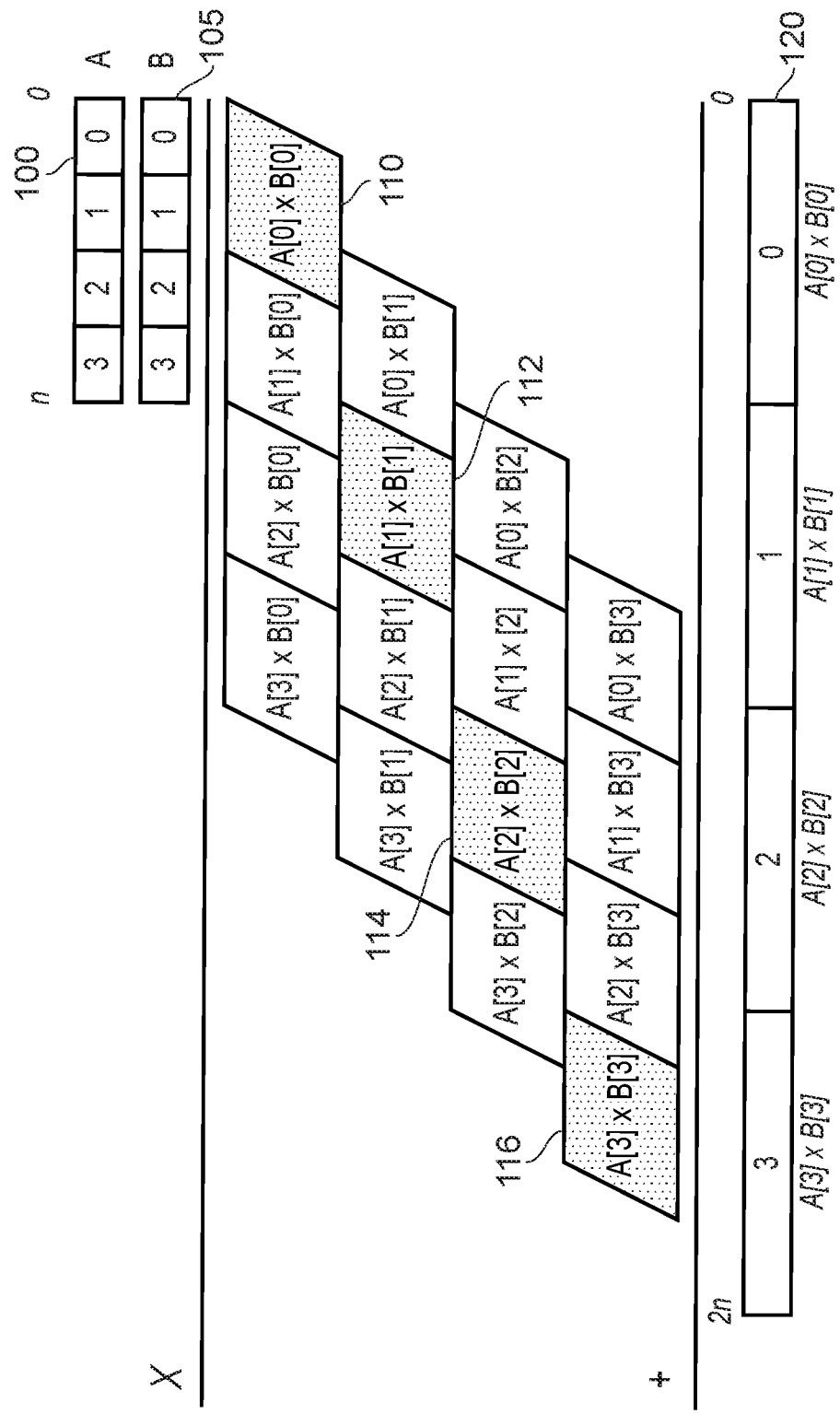
FIG. 11 is a diagram schematically illustrating a MAP operation (also referred to herein as a dot product operation) in accordance with a standard mechanism where no rearrangement is performed in respect of the input operands.

To recap on the principles employed when performing MAP operations (i.e. dot product operations), FIG. 11 illustrates how partial products may be accumulated within a standard multiplier array upon receipt of two input operands 100, 105. In this example, each input operand is assumed to consist of four portions, and each of the boxes within the multiplier array shows a particular partial product portion produced by multiplying one portion from operand A with one portion from operand B. When performing a dot product operation, the dot product operation is required to produce an accumulation result as follows:

$$\text{Dot product} = (A[0] \times B[0]) + (A[1] \times B[1]) + (A[2] \times B[2]) + (A[3] \times B[3])$$

Accordingly, the four partial product portions of interest are the portions 110, 112, 114, 116 highlighted in FIG. 11. Using a standard multiplier array, these required partial product portions can be output as the value 120, but it will be appreciated that those four values have not yet been accumulated, and accordingly additional adder circuitry would be required to add together those four values in order to produce the required dot product result.

Figure 12:
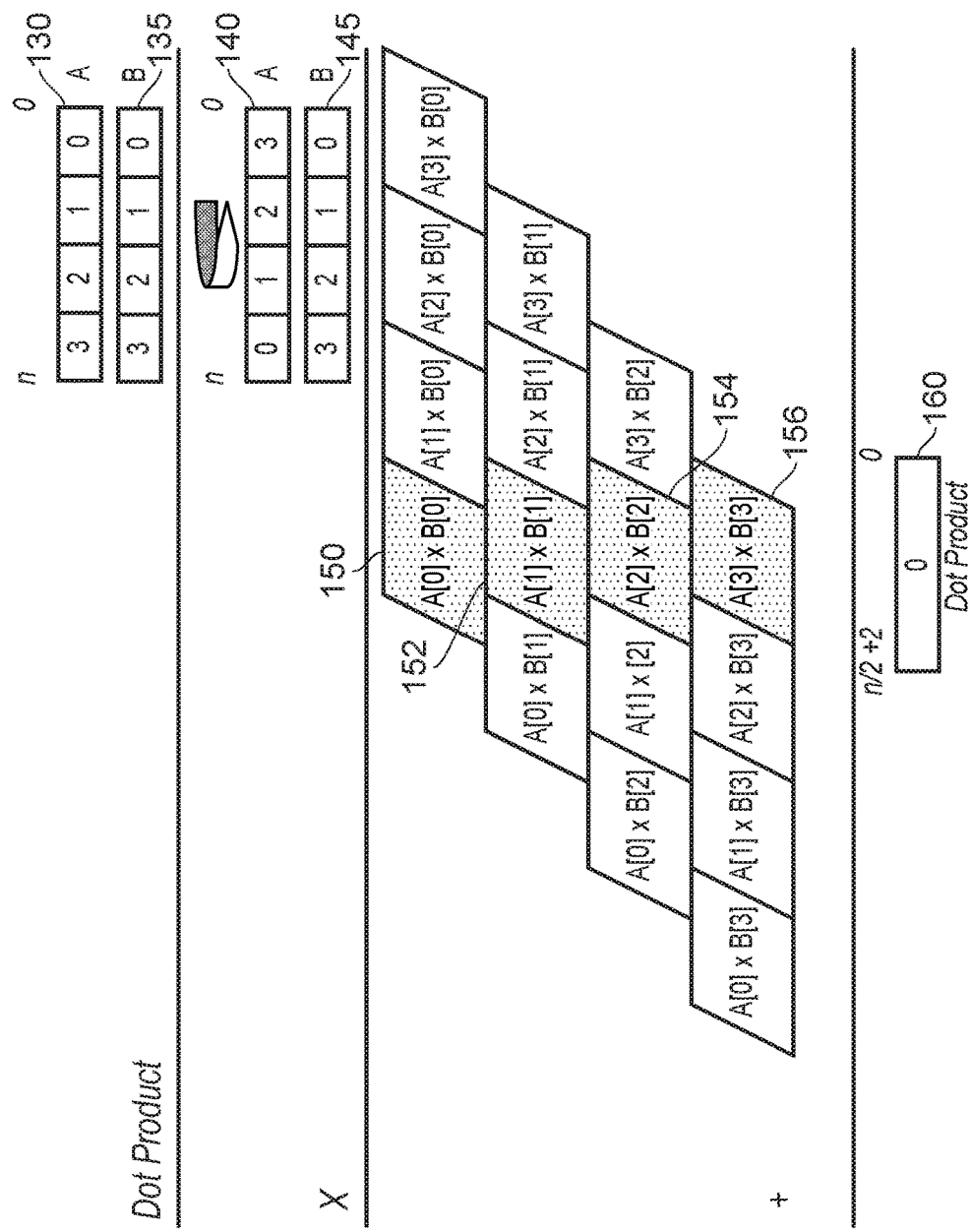
FIG. 12 is a diagram schematically illustrating performance of the same MAP operation as shown in FIG. 11, but where a rearrangement of one of the operands takes place.

As shown in FIG. 12, when employing the earlier described techniques the accumulation of the required partial product portions can be performed directly within the adder array, by rearranging one of the input operands so that the partial product portions of interest are all aligned within a particular column of adders within the array. Hence, the input operands 130, 135 can be subjected to a rearrangement operation in order to produce transformed first and second operands 140, 145. In this instance, only the portions within one of the operands are actually rearranged. In particular, it can be seen that the portions of the first operand 130 are reversed in order to produce the transformed operand 140. In contrast, the transformed second operand 145 corresponds directly to the second received input operand 135. Merely by reversing the portions within the first operand, this ensures that all of the required partial product portions 150, 152, 154, 156 are aligned vertically within the adder array, and accordingly can be accumulated to produce the dot product result 160. The dot product result 160 will typically be in carry-save form, and hence can be passed through a carry-propagate adder in order to produce the final dot product result.

In the example illustrated in FIG. 12, it is assumed that the MAP instruction specifies a single dot product operation to be performed, with each operand being considered to consist of four portions, and as a result four products 150, 152, 154, 156 are accumulated when performing the dot product operation. However, it is also possible for a single MAP instruction to specify multiple dot product operations. For instance, two dot product operations may be identified, each of which accumulates four products. In this example, the portion size within each of the input operands may be halved, so that each of the input operands comprises eight elements.

Figure 13:
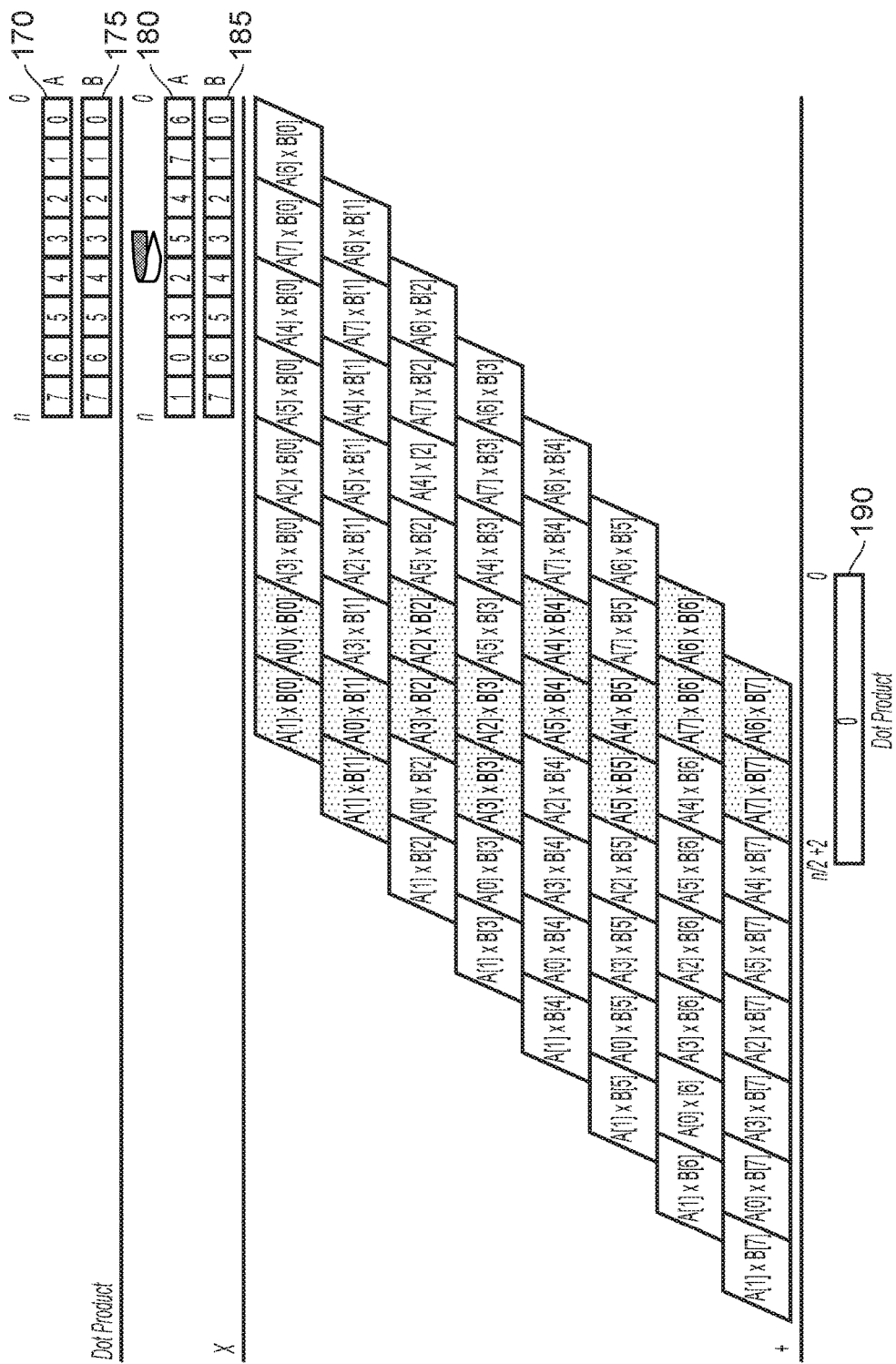
FIG. 13 schematically illustrates the same MAP operation as shown in FIG. 12, but with the elements depicted at a narrower granularity so as to allow comparison with later figures.

How the two dot product operations can be processed will be discussed later with reference to FIGS. 14 and 15, but first FIG. 13 illustrates the same single dot product operation as performed in FIG. 12, but with the granularity of the individual elements halved, so as to allow later comparison with the elements processed by FIGS. 14 and 15. Hence, the input operands 170, 175 are subjected to the rearrangement operation in order to produce the transformed first and second operands 180, 185. As with FIG. 12, only the first operand has its portions rearranged. In this example, whilst eight discrete elements are identified in the Figure, as will be apparent from the earlier described FIG. 12 there are actually only four portions being considered, and hence in the example of FIG. 13 each portion actually comprises two of the elements shown. It will be appreciated from a comparison of FIG. 13 with FIG. 12 that FIG. 13 in fact shows the same dot product operation, but merely with each operand portion considered to consist of two of the elements shown in FIG. 13.

Purely by way of illustration, let it be assumed that each of the input operands is 64 bits, and that the portions being manipulated in FIGS. 12 and 13 are 16-bit portions. FIG. 13 hence illustrates individual 8-bit elements, with two 8-bit elements forming each 16-bit portion.

Separate adders can be associated with each of the discrete partial product portions shown within the array structure of FIG. 13, and accordingly it can be seen that three columns of adders can be used to produce the required dot product result 190, by accumulating within the columns the particular shaded partial products shown. Additional carry-save adders can then be used to accumulate the results across the three columns, with the final result then being produced via a carry-propagate adder.

Figure 14:
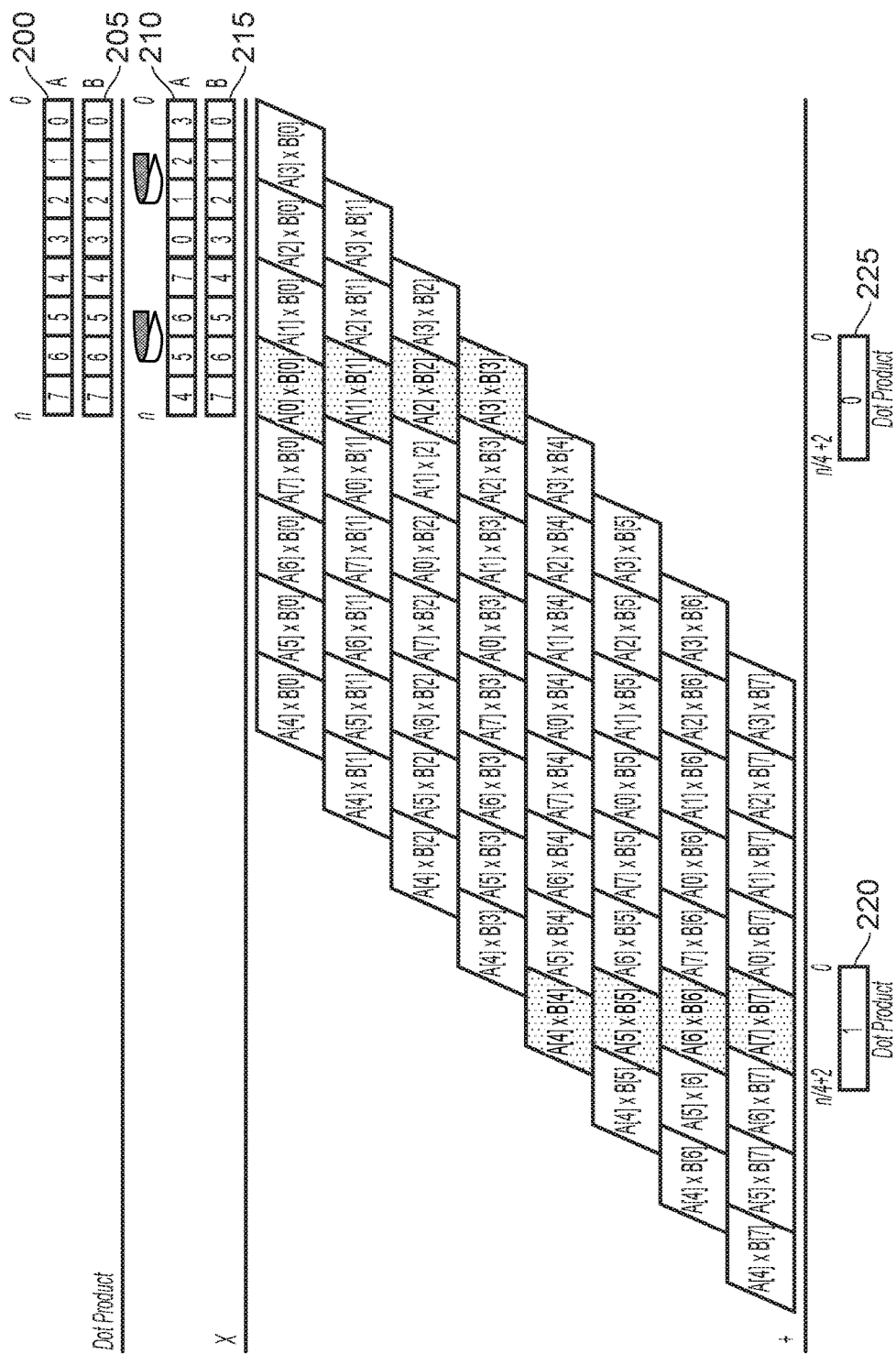
FIG. 14 illustrates execution of a MAP instruction that identifies two separate MAP operations.

FIG. 14 illustrates how the same adder array might be utilised were the MAP instruction instead to specify two separate dot product operations, with each of the portions then being viewed to have half the size of the portions processed in the example of FIGS. 12 and 13. In this particular case, it will be appreciated that each of the portions has the granularity of the individual elements shown in FIG. 14. Hence, purely by way of example, if the portions processed by the dot product operation of FIGS. 12 and 13 were 16-bit portions, then in accordance with the operations illustrated in FIG. 14, the individual portions are 8-bit portions. As a result, two segments are effectively defined within each of the input operands 200, 205, namely a first segment naming the portions 0-3 and a second segment identifying the portions 4-7.

As shown in FIG. 14, the rearrangement operation can be performed independently on each of the segments so that within the first segment of the first operand, the portions 0-3 are reversed and within the second segment the portions 4-7 are reversed, resulting in the transformed operand 210. As with the earlier example, it is assumed that the second operand is unchanged, and accordingly the transformed second operand 215 corresponds directly to the second input operand 205.

The highlighted columns then identify the columns where the partial product portions required for each dot product operation will be produced. Accordingly, the partial product portions can be accumulated within the respective columns in order to produce the two required dot product operation results 220, 225. As with the earlier examples, the two dot product results may be present in carry-save form, and a subsequent carry-propagate stage can be used to produce the final result. It should be noted that in this example two separate dot product operations are performed and accordingly two separate dot product results are produced. Those separate dot product results are not added together.

Whilst it is clear from FIG. 14 that the adder array can hence readily deal with MAP instructions that identify different numbers of dot product operations, it will also be appreciated that the columns within the adder array that are used differ depending on the number of dot product operations specified by the MAP instruction.

However, in accordance with the technique described herein, the rearrangement operation can be modified so that the required product portions are mapped into the same subset of columns in the adder array, independent of the number of dot product operations defined by the MAP instructions. This is illustrated schematically in FIG. 15.

In particular, the two input operands 230, 235 are subjected to the rearrangement operation, but in this case each of the operands has its respective portions rearranged in a particular manner that causes the required product portions to be accumulated to be aligned with a subset of the columns used when performing the single dot product operation discussed earlier with reference to FIG. 13. The particular rearrangement operation performed in this instance is shown in the Figure by reference to the element numbers associated with the transformed operands 240, 245. As a result of the rearrangement performed, it can be seen that the required partial product portions are aligned with the two outer columns of adders that were used when performing the single dot product operation discussed earlier with reference to FIG. 13, and accordingly when the two dot product operations are performed the two required dot product results 250, 260 can be readily produced by reusing the adder circuitry that would be used had a single dot product operation been specified by the MAP instruction.

Figure 15:
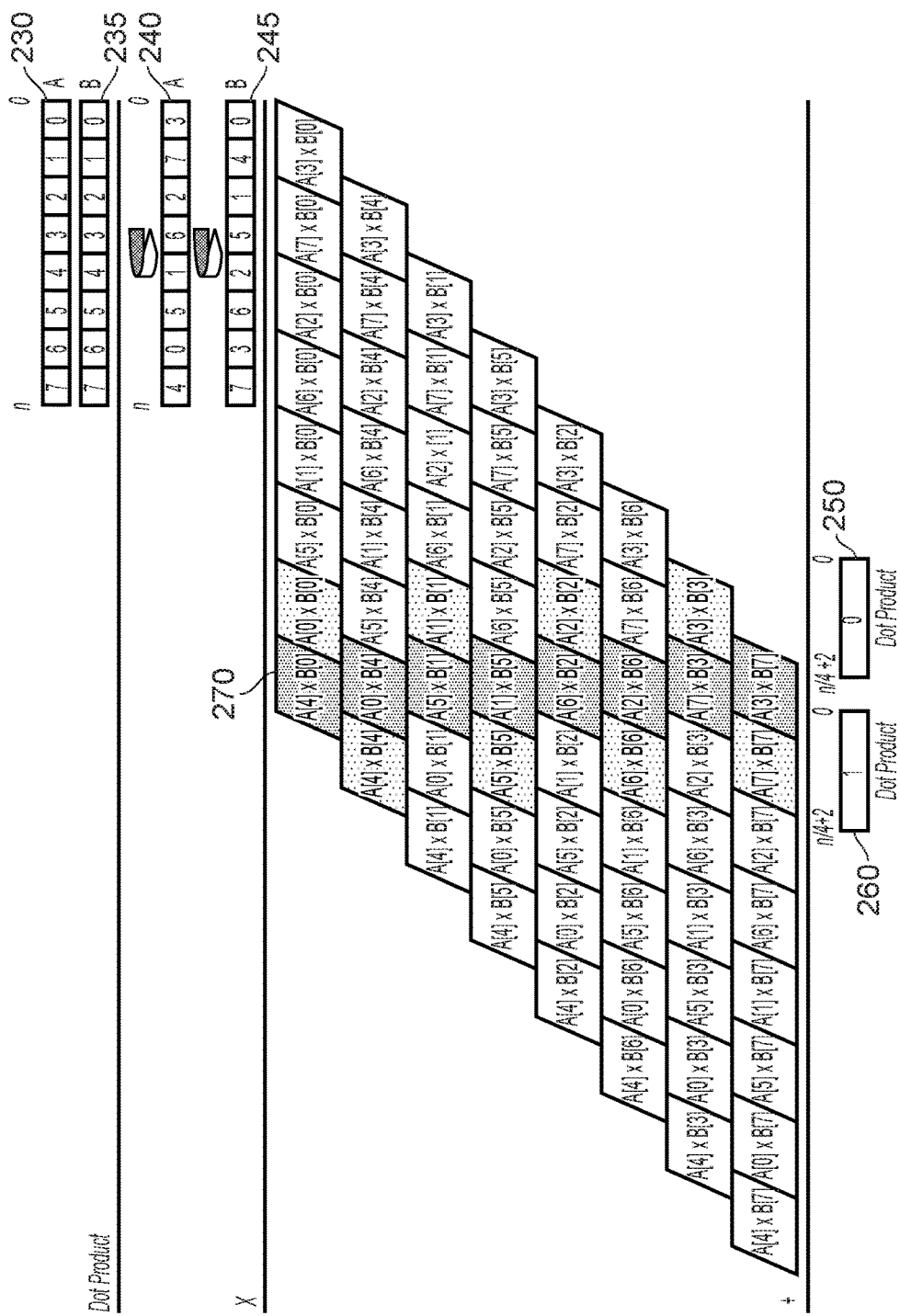
FIG. 15 schematically illustrates execution of the same MAP instruction as in FIG. 14, but where the rearrangement operation is modified so that the partial product elements that need to be accumulated are aligned with columns of adders used for the MAP operation of FIG. 13.

It should be noted that whilst in the example illustrated in FIG. 15, two separate dot product operations are defined, each operating on a separate segment of each of the input operands, the rearrangement of the individual elements is not constrained to the segment boundaries, when producing the transformed first and second operands 240, 245. As also shown in FIG. 15, the column of adders 270 is unused in this case, as the product portions associated with that column are not required when producing the dot product results.

By such an approach, this can significantly reduce the gating circuitry associated with the various adders within the adder array, since the same subset of columns of adders will be used for processing each of the variants of MAP instruction, irrespective of the number of MAP operations specified by the MAP instructions. This hence significantly reduces the number of carry save adders that are required when performing MAP operations, and can maintain minimal carry propagate adder cost.

It also has the benefit that it enables, if desired, the generation of a dedicated adder array whose columns of adders are used solely for performing such dot product operations. In particular, the full array of adders illustrated in FIGS. 13 to 15 are no longer required, and instead only a subset of columns need to be produced within a dedicated adder array for performing dot product operations, due to the rearrangement operation ensuring that the same columns are reused when the number of dot product operations specified by the instruction changes. This hence allows a significant reduction in the number of adders that needs to be provided within an apparatus in order to support the performance of dot product operations, if dedicated adder array circuitry can be used for that purpose.

Even in instances where it is desirable to retain a full multiplier array as shown in the Figures, the use of the technique illustrated with reference to FIG. 15 can simplify the control logic for performing dot product operations, since only a subset of the columns of the multiplier array will be needed.

Whilst the technique can be applied generically to any size of input operand values, and for various combinations of portion sizes, in one particular embodiment it is assumed that each of the operands are 64-bit operands, and that a first variant of the MAP instruction specifies a single MAP operation operating on four 16-bit portions, whilst a second variant of the MAP instruction specifies two MAP operations, each operating on four 8-bit portions within a corresponding 32-bit segment of the input operands. As be apparent from FIGS. 13 and 15, in such an example three columns of adders can be used to perform the accumulation of partial product portions when executing the first variant of the MAP instruction, whilst two of those three columns can then be reused when executing the second variant of the MAP instruction.

Figure 16:
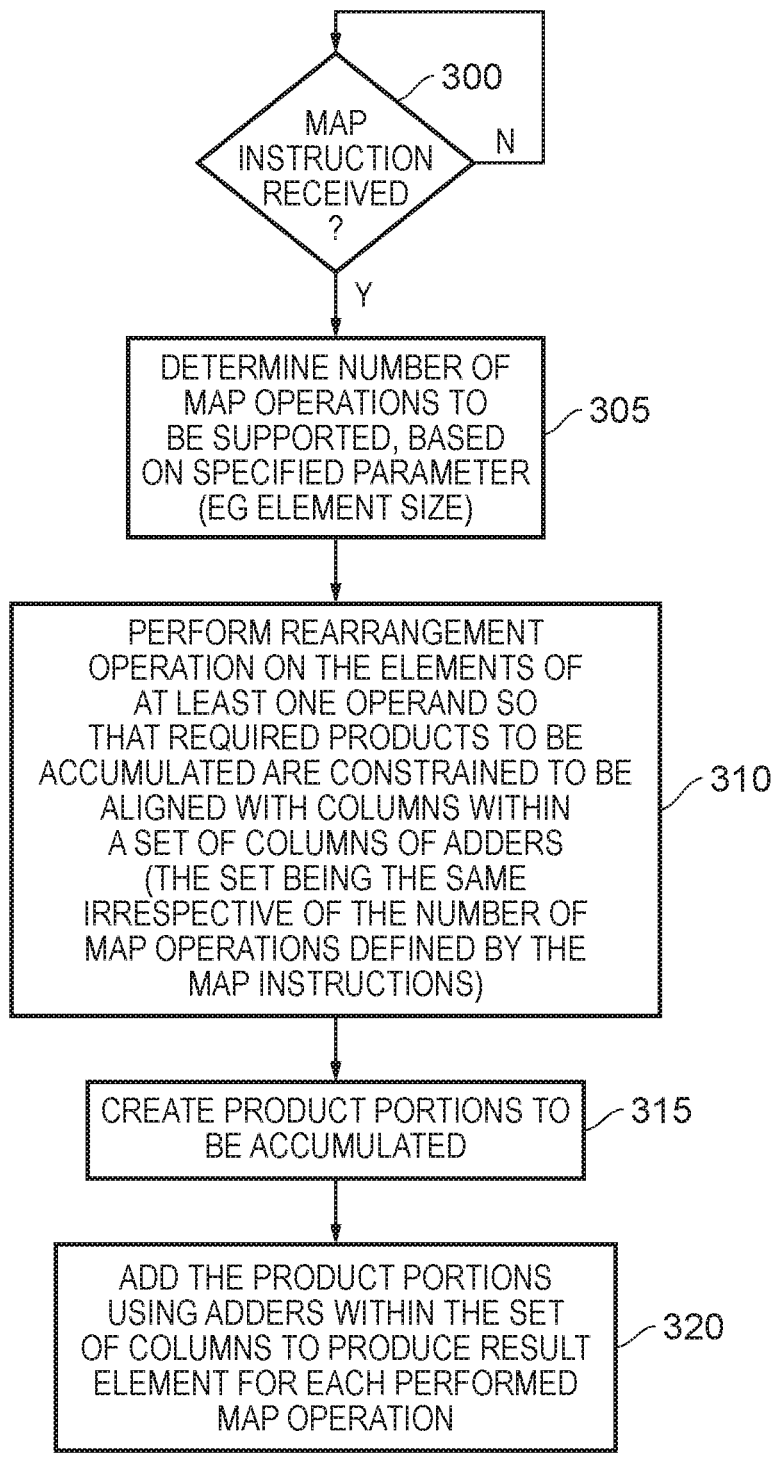
FIG. 16 is a flow diagram illustrating the performance of MAP operations in accordance with the technique illustrated by way of example with reference to FIGS. 13 and 15.

FIG. 16 is a flow diagram schematically illustrating the operation performed in the above described examples. At step 300, it is determined whether a MAP instruction has been received, and if so then at step 305 the number of MAP operations to be supported is determined based on a specified parameter. In one embodiment, that parameter is identified within the instruction, and may for example identify an element size. Using the earlier specific example where the input operands are 64 bits, then if the element size is specified as 16 bits, one MAP operation will be required, and if the element size is specified as 8 bits, two MAP operations will be required.

It is also worth noting at this point that while the number of MAP operations to be supported is determined in the above manner, not all of the supported MAP operations will necessarily be performed. In particular, a restriction parameter can be specified, for example within the instruction itself, to selectively restrict the number of MAP operations performed. Hence, in the event that multiple MAP operations are identified at step 305, the restriction parameter may identify that one or more of those multiple MAP operations is not in fact performed, such that only a subset of the multiple MAP operations are actually performed.

At step 310, a rearrangement operation is performed on the elements of at least one of the operands so that the required products to be accumulated are constrained to be aligned with columns within a set of columns of adders. In some instances, only one of the operands may actually have its elements rearranged, whilst in other instances the elements within both operands may be rearranged. For instance, considering the FIG. 13 example, only one of the operands has its elements rearranged, whilst it will be apparent from the FIG. 15 example that both operands have their elements rearranged during step 310.

As indicated by step 310 of FIG. 16, the set of columns of adders is the same irrespective of the number of MAP operations defined by the MAP instruction. Hence, by way of example, when performing the single MAP operation illustrated with reference to FIG. 13, three columns may be identified within the set. When performing the two MAP operations illustrated in FIG. 15, the same set of three columns are identified, and in fact only two of those columns are actually used to produce the required results for the two dot product operations.

At step 315, the product portions to be accumulated are created, for example using the partial product forming circuitry 54 discussed earlier.

Then, at step 320, the required product portions are added together using adders within the set of columns, in order to produce a result element for each performed MAP operation. As will be apparent from the discussion in FIG. 13, a number of additional carry-save adders may be required to accumulate the results generated within each of the three indicated adder columns, but as will be apparent from FIG. 15 no further carry-save adders are required when producing the two separate dot product results 250, 260.

As will be apparent from the above discussions, in accordance with the techniques described herein different rearrangement schemes can be used for the operand elements, dependent on the number of dot product operations being performed in response to the MAP instruction. In a particular example, one variant of the MAP instruction may support one dot product operation using 16-bit elements whilst another variant of the instruction may support two dot product operations, each operating on 8-bit elements. For the 16-bit elements implementation, a simple operand reversal approach may be used in order to align the required partial products with a number of columns of adders within an adder array. However, for the case where two separate dot product operations are performed, operating on 8-bit elements within discrete 32-segments of the input operands, the rearrangement operation is modified so as to implement an interleaving scheme which effectively pushes the required partial products inwards towards the centre of the adder tree so as to overlay with columns used when performing the single dot product operation on 16-bit elements, as will be apparent from the comparison of FIG. 14 (where the above described approach is not used) and FIG. 15 (where the above described approach is used). Such an approach can yield significant area and power consumption benefits.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform data processing, the processing circuitry comprising an adder array having a plurality of adders for accumulating partial products produced from input operands;
an instruction decoder responsive to a multiply-and-accumulate-products (MAP) instruction specifying a first operand comprising J bits and a second operand comprising K bits, to control the processing circuitry to enable performance of a number of multiply-and-accumulate-products operations, where the number is dependent on a parameter, such that for each performed multiply-and-accumulate-products operation, the processing circuitry is arranged to generate a corresponding result element representing a sum of respective E×F products of E-bit portions within an X-bit segment of the first operand with F-bit portions within a Y-bit segment of the second operand, where E<X≤J and F<Y≤K;

wherein, in response to the MAP instruction, the instruction decoder is configured to control the processing circuitry to perform a rearrangement operation to rearrange the portions of at least one of the first operand and the second operand to form transformed first and second operands so that the E×F products that are required to be summed are aligned with a number of columns of adders within the adder array, and to control the adder array in dependence on the transformed first and second operands to add the required E×F products using said number of columns of adders within the adder array;

wherein the rearrangement performed by the rearrangement operation is controlled in dependence on the parameter such that at least one column of adders used when the parameter indicates a first number of multiply-and-accumulate-products operations is reused when the parameter indicates a second number of multiply-and-accumulate-products operations different from said first number.

2. An apparatus as claimed in claim 1, wherein:

a plurality of columns of adders within the adder array are used to add the required E×F products when the parameter indicates the first number of multiply-and-accumulate-products operations; and when the parameter indicates the second number of multiply-and-accumulate-products operations, the rearrangement performed by the rearrangement operation is controlled such that the E×F products that are required to be summed during performance of said second number of multiply-and-accumulate-products operations are added using only columns of adders within said plurality of columns.

3. An apparatus as claimed in claim 1, wherein each multiply-and-accumulate-products operation is arranged to operate on a fixed number of portions of the first operand and a fixed number of portions of the second operand, and the number of multiply-and-accumulate-products operations that are enabled to be performed in response to the MAP instruction is dependent on the number of portions within at least one of the first operand and the second operand.

4. An apparatus as claimed in claim 1, wherein the parameter comprises an element size specified for the MAP instruction, the element size being used to determine values of E and F.

5. An apparatus as claimed in claim 4, wherein J and K are determined by a vector width of the apparatus.

6. An apparatus as claimed in claim 4, wherein:

when the element size specifies a first value, both the first operand and the second operand comprise a single segment such that a single multiply-and-accumulate-products operation is enabled to be performed, and when the element size specifies a second value at least one of the first operand and the second operand comprise multiple segments such that a plurality of multiply-and-accumulate-products operations are enabled to be performed; and the rearrangement performed by the rearrangement operation is controlled in dependence on the element size such that the columns of adders used for performance of the single multiply-and-accumulate-products operation when the element size specifies the first value are reused for performance of the plurality of multiply-and-accumulate-products operations when the element size specifies the second value.

7. An apparatus as claimed in claim 6, wherein:

when the element size specifies the second value at least one of the first operand and the second operand comprise two segments such that two multiply-and-accumulate-products operations are enabled to be performed; and the rearrangement performed by the rearrangement operation is controlled in dependence on the element size such that a number of outer columns within the columns of adders used for performance of the single multiply-and-accumulate-products operation when the element size specifies the first value are reused to perform the two multiply-and-accumulate-products operations when the element size specifies the second value.

8. An apparatus as claimed in claim 7, wherein:

J=K, and E=F;

when the element size specifies the first value, E comprises T bits, X=Y=J=K, and the single multiply-and-accumulate-products operation is arranged to sum J/E E×F products using a plurality of columns of adders;

when the element size specifies the second value, X=Y=J/2, E comprises T/2 bits, and each of the two multiply-and-accumulate-products operations is arranged to sum X/E E×F products using at least one outer column of said plurality of columns of adders.

9. An apparatus as claimed in claim 1, wherein the processing circuitry is arranged to perform each of the number of multiply-and-accumulate-products operations determined from the parameter.

10. An apparatus as claimed in claim 1, wherein when the number of multiply-and-accumulate-products operations determined from the parameter is a plurality of multiply-and-accumulate-products operations, the instruction decoder is responsive to a restriction parameter to selectively disable performance of a subset of the plurality of multiply-and-accumulate-products operations by the processing circuitry.

11. An apparatus as claimed in claim 1, wherein:

the adder array is dedicated adder circuitry for use when performing the multiply-and-accumulate-products operations, and is formed by a plurality of columns of adders forming said number of columns of adders; and the rearrangement operation performed in dependence on the parameter is arranged to ensure that, irrespective of the number of multiply-and-accumulate-products operations that are enabled to be performed, the E×F products that are required to be summed are constrained so as to be aligned with one or more columns in said plurality of columns.

12. An apparatus as claimed in claim 1, wherein:

the adder array is provided within a L×M multiplier array that enables an L-bit operand to be multiplied with an M-bit operand using a plurality of columns of adders for accumulating partial products of the L-bit operand and the M-bit operand;

J≤L and K≤M; and the rearrangement operation performed in dependence on the parameter is arranged to ensure that, irrespective of the number of multiply-and-accumulate-products operations that are enabled to be performed, the E×F products that are required to be summed are constrained to be aligned with one or more columns in a subset of the columns of adders within the L×M multiplier array, the subset of the columns of adders forming said number of columns of adders, such that irrespective of the number of multiply-and-accumulate-products operations to be performed in response to the MAP instruction, the subset of columns of adders are used to sum the required E×F products.

13. The apparatus according to claim 1, comprising operand rearrangement circuitry to rearrange the portions of at least one of the first operand and the second operand to form the transformed first and second operands.

14. The apparatus according to claim 13, wherein for at least one segment of at least one of the first and second operands, the operand rearrangement circuitry is configured, for at least one value of the parameter, to reverse an order of the portions within that segment to form a corresponding segment of the corresponding at least one of the first and second transformed operands.

15. The apparatus according to claim 13, wherein the operand rearrangement circuitry is configured to rearrange the portions of at least one of the first operand and the second operand according to one of plurality of different rearrangement patterns selected in dependence on the parameter.

16. The apparatus according to claim 1, wherein for at least one value of the parameter, the instruction decoder is configured in response to the MAP instruction to control the processing circuitry to rearrange portions of both the first operand and the second operand when producing the transformed first and second operands.

17. The apparatus according to claim 1, comprising partial product forming circuitry to generate the partial products to be accumulated by the adders of the adder array.

18. The apparatus according to claim 17, wherein in response to the MAP instruction, the instruction decoder is configured to control the partial product forming circuitry to generate the partial products in dependence on the first and second transformed operands.

19. The apparatus according to claim 17, wherein in response to the MAP instruction, the instruction decoder is configured to control the partial product forming circuitry to set a subset of partial product bits of the partial products to zero irrespective of values of said first operand and said second operand.

20. The apparatus according to claim 19, wherein the instruction decoder is configured to control the partial product forming circuitry to select which partial product bits are said subset of partial product bits in dependence on the parameter.

21. A method of performing multiply-and-accumulate-products operations within an apparatus having processing circuitry to perform data processing, the processing circuitry comprising an adder array having a plurality of adders for accumulating partial products produced from input operands, the method comprising:
in response to a multiply-and-accumulate-products (MAP) instruction specifying a first operand comprising J bits and a second operand comprising K bits:
enabling performance by the processing circuitry of a number of multiply-and-accumulate-products operations, where the number is dependent on a parameter, such that for each performed multiply-and-accumulate-products operation the processing circuitry generates a corresponding result element representing a sum of respective E×F products of E-bit portions within an X-bit segment of the first operand with F-bit portions within a Y-bit segment of the second operand, where $E<X \leq J$ and $F<Y \leq K$;
performing a rearrangement operation to rearrange the portions of at least one of the first operand and the second operand to form transformed first and second operands so that the E×F products that are required to be summed are aligned with a number of columns of adders within the adder array; and
controlling the adder array in dependence on the transformed first and second operands to add the required E×F products using said number of columns of adders within the adder array;
wherein the rearrangement performed by the rearrangement operation is controlled in dependence on the parameter such that at least one column of adders used when the parameter indicates a first number of multiply-and-accumulate-products operations is reused when the parameter indicates a second number of multiply-and-accumulate-products operations different from said first number.

* * * * *